United States Patent
Burke et al.

(10) Patent No.: US 9,827,699 B2
(45) Date of Patent: Nov. 28, 2017

(54) PAD FORMATION METHOD, ASSEMBLY AND PAD PRODUCED THEREBY

(71) Applicant: PREGIS INTELLIPACK LLC, Deerfield, IL (US)

(72) Inventors: Scott Burke, Haysville, KS (US); Todd Hanna, Tulsa, OK (US)

(73) Assignee: Pregis Intellipack LLC, Deerfield, IL (US)

( * ) Notice: Subject to any disclaimer, the term of this patent is extended or adjusted under 35 U.S.C. 154(b) by 296 days.

(21) Appl. No.: 14/740,091

(22) Filed: Jun. 15, 2015

(65) Prior Publication Data

US 2015/0273741 A1   Oct. 1, 2015

Related U.S. Application Data

(63) Continuation of application No. 12/533,776, filed on Jul. 31, 2009, now Pat. No. 9,056,410.

(Continued)

(51) Int. Cl.
*B29C 44/56*     (2006.01)
*B29C 44/18*     (2006.01)
(Continued)

(52) U.S. Cl.
CPC ........ *B29C 44/5627* (2013.01); *B29C 44/182* (2013.01); *B29C 44/306* (2013.01); *B29C 44/60* (2013.01); *B29L 2031/58* (2013.01)

(58) Field of Classification Search
CPC ...... B29C 44/182; B29C 44/306; B29C 44/60
See application file for complete search history.

(56) References Cited

U.S. PATENT DOCUMENTS 5,395,563 A * 3/1995 Goto ................... B29C 47/0023
                                                        156/244.13
5,584,120 A * 12/1996 Roberts .................. H01R 31/00
                                                        156/154

(Continued)

FOREIGN PATENT DOCUMENTS

WO   WO 2004101252 A2 * 11/2004 ............. B29C 44/18

*Primary Examiner* — James Sanders
(74) *Attorney, Agent, or Firm* — Dorsey & Whitney LLP

(57) ABSTRACT

A foam cushion pad formation assembly that includes a conveyance assembly having at least one moving conveyor component presenting a pad shape formation surface, which surface is convoluted and arranged to shape sealed enclosures of a pad chain received by the conveyance assembly. A separation device is provided to separate shaped pads of the pad chain received by said conveyor device. The shaped pads include convoluted surface that are formed by way of gripping projection and recesses combinations in the moving conveyor component. Embodiments include sensing for non separated pads from a downstream end of the bag chain, pad chain separation enhancement devices, and various control system including the requirement of confirmation of separation before feeding a new pad enclosure as in one containing liquid polyurethane precursor chemicals. An embodiment includes a pad chain path disruption sensor and a form feed control which implements the formation of pad enclosures free of filler material in a bridging region between the outlet end of the enclosure formation means and the conveyance assembly.

20 Claims, 10 Drawing Sheets

Related U.S. Application Data

(60) Provisional application No. 61/136,005, filed on Aug. 5, 2008.

(51) Int. Cl.
    *B29C 44/30*     (2006.01)
    *B29C 44/60*     (2006.01)
    B29L 31/58     (2006.01)

(56) References Cited

U.S. PATENT DOCUMENTS

| | | | | |
|---|---|---|---|---|
| 5,794,406 A | * | 8/1998 | Reichental | B29C 44/182 53/113 |
| 6,234,777 B1 | * | 5/2001 | Sperry | B29C 44/182 425/112 |
| 6,500,292 B1 | * | 12/2002 | Mossbeck | A47C 27/122 156/219 |

\* cited by examiner

PAD FORMATION METHOD, ASSEMBLY AND PAD PRODUCED THEREBY

This application is a continuation of U.S. application Ser. No. 12/533,776 filed Jul. 31, 2009, now U.S. Pat. No. 9,056,410, entitled "Pad Formation Method, Assembly and Pad Produced Thereby," which is hereby incorporated by reference in its entirety, and which claims the benefit of U.S. Provisional Application No. 61/136,005 filed on Aug. 5, 2008.

CROSS REFERENCE TO RELATED APPLICATIONS

As an example of a conventional method for manufacturing a flat, rectangular foam cushion or pad, the process starts when foam filled bags are produced such as in a conventional Foam-in-bag (FIB) system. An example of a conventional FIB system is found in U.S. Pat. No. 7,331,542 to IntelliPack, Inc. of Tulsa Okla. USA, and which patent is incorporated herein by reference.

BACKGROUND DISCUSSION

A conventional method for manufacturing a flat, rectangular foam cushion or pad further includes a flat cushion making module which is conventionally comprised of two linear conveyors, each with a flat belt, mounted so that their belts are opposed and substantially parallel to each other.

Known in the art is a process of making flat, rectangular, foam cushions (sometimes referred to as "pads"), as in the formation of pads in the foam packaging industry. Current techniques and methods used by existing pad molders are described as follows: Contemporary Methods for Manufacturing Flat, Rectangular, Foam Cushions a. The opposing conveyor belts are spaced apart to the desired thickness of the ultimate flat foam cushion—usually between one to two inches of thickness.

b. Each conveyor belt moves at substantially the same speed, with one conveyor rotating in a clockwise direction and the other rotating in a counterclockwise direction so that the pads are pulled into the gap by the conveyors relative motions. The conveyors start and stop simultaneously so that they move as a synchronized pair to prevent shearing of the flat foam cushions as they move.

c. The conveyors conventionally are set up in either a vertical or horizontal orientation.

The foam filled bags exit the FIB bagger which is positioned so that the descending bags will be dispensed in the general direction of the gap between the belts of the moving conveyors. In reality, current flat cushion molding systems require an operator to feed the bags (that come down or out from the FIB system) into the gap between the conveyors. Otherwise, the not yet cured bags have a tendency to fold over or otherwise miss-feed into the conveyors causing the foam bags to burst within the machine. This is commonly known as a "foam-up".

Thus, in such a conventional feed operation;

a. Both belts advance as the bag exits the FIB machine to essentially pull or drag the foam filled bag into the gap between the conveyor belts as the bag exits from the output portion of the FIB system.

b. For satisfactory operation, it is conventional in the industry that a human operator assists in getting the bags to feed properly into the conveyor gap.

c. The foam filled bag must be pulled into and fully constrained by the opposing conveyor belts early in the foam expansion cycle so that the rising foam inside the bag forms itself to the gap (sized to the desired cushion thickness) between the opposing belt surfaces.

d. If the foam expands excessively prior to the bag getting pulled into the gap between the conveyors, the conveyors may not be able to pull the forming bag in, and it will jam up the entry zone essentially stopping the process until the jam is cleared.

e. In conventional systems the process timing is mainly determined through testing and experimentation. The timing of the process is generally based on the type of foam being used, the speed of the conveyors, and other factors.

The foam rises and solidifies while contained between the conveyor belts.

a. The foam expansion in the bag is restricted and controlled by the distance of separation between the belts. For example, if the belts are spaced one inch (2.54 cm) apart the final flat cushion will be one inch (2.54 cm) thick.

b. Typical flat cushion thicknesses range between ½ inch (1.26 cm) to 3 inches (6.62 cm).

c. Typical flat foam cushion molding systems have built-in means of adjusting the spacing between the conveyors while maintaining them in a parallel orientation. This is usually done with a manually driven crank and chain arrangement.

d. This allows the flat cushion user to adjust cushion thickness to suit the application.

The expanding foam will generate a pressure in the range of 3 pounds per square inch so the support structures of the forming conveyors must be robust enough to handle these loads without undue deflection.

a. To maintain flatness each belt in conventional systems features a stationary, rigid, and flat backer plate mounted directly behind the belt.

b. The belts slide over the backer plates so the plates require a low coefficient of friction to minimize drag.

c. The backer plates and their support structures must be rigid and strong so as to remain essentially flat under the loads generated by the pressure of the rising foam.

d. The rigid backer plates insure that the finished foam cushions will be basically flat.

e. Also, the drive motors on each belt must be strong enough to move the belts with high friction loads generated by the expansion of the foam pushing the belt into its backer plate. These loads can be in the hundreds of pounds and the required motors may be larger than what would typically be associated with the size of conveyor involved.

The flat foam cushions move, as they cure and harden, contained between the belts along their axis of motion.

a. The curing flat cushions are confined within the gap between the conveyor belts until the foam is sufficiently cured to retain its intended shape as flat and rectangular when removed from between the conveyors.

b. If the flat foam cushions are taken out from between the pair of conveyors too soon the foam will not be sufficiently cured, and the foam cushions will not hold their desired flat shape.

Flat cushion width is primarily determined by the width of the film used to form the flat cushion. Typical widths range from 12 to 30 inches.

After the foam in the cushion has cured sufficiently so as to retain its flat shape, the conveyors will move it along until it drops out at the end of its travel.
   a. As they fall out of the conveyor output, the flat foam cushions can be collected in storage or accumulator bins—they can be used by a packer—or they can fall onto another conveyor to take them away for use or storage at a remote location.

The flat foam cushion production rate can be increased by lengthening the conveyors.
   a. It generally takes at least 20 seconds for a typical illustrative cushion to cure to a point that it can be removed from the constraining conveyor belts. For some of the denser foam formulations this minimum time can be much longer than the aforementioned 20 seconds as in one minute.
   b. Longer belts allow for more curing time per cushion and faster production rates.

Longer belted systems will have a greater flat cushion per minute output up to the limitations of the bag making module.
   c. It is believed that there exists in illustrative conventional systems flat foam cushion molders capable of running at up to 26 cushions per minute but in reality running at the limiting factor of the output rate of the bag making module is typically the norm.

The conventional systems generally suffer from the drawback of not being sufficiently generally fully automated in the formation of flat foam cushions or well suited for running without a human operator.
   a. That is, it is considered by Applicants that suitable flat foam cushion production systems in the industry and using current technology are of a nature that requires monitoring and assistance from an operator to prevent foam ups.
   b. The most common problem occurs when a corner or an edge of a bag catches and gets folded over as it enters the gap between the molding conveyors.
   c. When the film is folded, the effective bag volume is restricted and has a lesser capacity with which to contain the expanding foam which has already been dispensed in the quantity required for the anticipated bag volume.
   d. When this happens, a bag rupture and a possible explosion of foam can occur if the available bag volume cannot hold the amount of foam dispensed into the bag.
   e. These ruptures and/or explosions, often called foamups, can be especially messy and difficult and time consuming to clean.
   f. Another problem is that the flat cushions, if not properly oriented, will jam inside the conveyor. These jams can also cause a foam-up as succeeding bags continue to enter the conveyor system and an operator is not available to shut the system down in a timely manner.

Problems such as those described above are common in the foam cushion packaging industry such as in the production of cured polyurethane flat panel packaging cushion inserts.

Problems such as those described above for the foam cushion packaging industry can also be experienced in the production of other "pad" components (e.g., enclosures (typically flexible) that enclose material which is placed in the enclosure (which material is typically flexible at the outset and forms as to be less flexible such as in a curing or solidifying during cooling down or setting, etc.)). Examples of other packaging industries that can experience problems such as those described above include, for example, the food industry, the chemical industry (e.g., plastics) and construction powdered mixes, etc., although expanding types of materials are the more problematic.

SUMMARY OF THE INVENTION

Operation Description for Embodiments of the Present Invention

In a first embodiment of the present invention, the operation of a pad formation system is described as follows. The process starts with bags being manufactured by using an enclosure formation device as in a Foam-in-bag (FIB) system such as that described in U.S. Pat. No. 7,331,542 to IntelliPack Inc., but with a setting that is different than the preferred setting described in U.S. Pat. No. 7,331,542. That is, there is provided an enclosure formation device in the form of a bag formation means with a bag making module as a component of the pad formation system of the present invention. This enclosure or "bag" formation means can take on a wide variety of forms other than that described in U.S. Pat. No. 7,331,542 inclusive of other material containing enclosures for which pad formation is beneficial.

That is, in an embodiment, as in one using plastic film based bags, unlike the standard mode of processing in the above noted FIB method, the bags are preferably not cut and separated from the web by a cut wire mounted onto the heated jaw at the exit of the bagger or with one directly associated with the FIB bagger (e.g., a cutter supported on a common support platform). Instead of the standard mode of cutting and separating bags as they exit the bagger module in the above noted U.S. '542 FIB system, the present invention does not implement a cutting at this point (as by not powering up a resistance cut wire or by way of removing the cut wire associated with the bag module cutter with heated jaw featured in the '542 patent).

As described below, the bags are still sealed; preferably, however, with separate top and bottom seals as by the sealing technique carried out in the FIB system of U.S. '542 FIB system (e.g., a wire at a temperature suitable for forming a seal bond but not a separation cut).

In an preferred embodiment of the present invention, with the cut wire not powered up or removed from the heated combination cutting/sealing jaw of the FIB bagger, the bags exiting the FIB bagger remain attached via the seal webbing region as they exit from the output of the bag making module and enter the below described pad formation assembly or pad formation means. An additional, alternate embodiment includes retaining a chain series of bags with a partial interconnection between respective bags as in a perforated cut line or a ribbon or tab attachment either by the inclusion of additionally applied material (e.g., one or more series of interconnecting ribbons) and/or bag interconnection tabs formed by a less than continuous or full length cutting (e.g., a cut line that is centered but not of full length relative to the width/length of bag being cut). As seen from the discussion below the maintenance of bag interconnection has advantages relative to the below described pad formation assembly operation, and a complete or non-interrupted web is preferred in some setting as better suited for the pull of a bag chain through a pad formation assembly. Alternate, less preferred embodiments include, for example, sealing and cutting with the bag formation means (e.g., a single seal-cut line or combination seal and complete cut lines) and running individual bags through the below described pad formation assembly of the present invention instead of a bag chain. Mode toggle means is also featured under an embodiment of the present invention wherein logic control and operator menu or a control panel allows the operator to toggle between different techniques (e.g., interconnected (full and/or partial interconnection) bag run through the pad formation means or non-interconnected, individual bag run through mode) either through the pad formation assembly or upon a removal of the pad formation assembly—which allows an operator to use the bagger in alternate modes depending upon the operator's present needs.

A second component of the pad formation system of the present invention (which second component itself is representation of an invention in and of itself) includes a pad formation assembly or pad formation means that is preferably positioned directly downstream relative to the bag output location of the bag formation means as to avoid having to rely on an operator to feed manually the formed bags to the pad formation assembly. Alternate (less preferred) embodiments of the present invention include, however, embodiments wherein an operator feeds bags to the pad formation assembly (e.g., based on an operator at least partially manually positioning bags such as one within arms length of the output of the bag formation means and the input of the pad formation assembly or based on an operator being remote from the bag formation means when inputting bags into the pad formation assembly as in a quick transfer to a relative closely positioned pad formation assembly with the distance depending in many embodiments on the cure period for the material (e.g., a longer curing time in the foam can provide for more time before the bag expands to a level that makes it difficult to feed into the pad formation systems input). Because of the characteristics of the foam in foam pads (e.g., urethane foam), as in those utilized in pads for packaging or insulation, the pad formation embodiments described herein are particularly well suited for handling such situations. For example, urethane foam (and like reactionary products) has the properties of rising slowly with minimized reactionary force, of highly moldable prior to setup and cure. These properties of foam pads render the disclosed embodiments described herein well suited for such applications.

In one embodiment, the bags are not cut from the web, and the entire web (e.g., the formed bag chain web) is pulled into the pad forming gap between the below described conveyor components. For example, the bag chain web is pulled into a gap formed between a belt and a fixed in position platen (or some alternate conveyance assembly combination of conveyor components as in one with a second conveyor belt or some alternate moving conveyance means as in a moving platen, etc.). A preferred embodiment of the pad formation assembly comprises a driven conveyor belt and a non-moving platen. The number of bags in the web can be continuously run without any predetermined breaks in the chain or there can be a predetermined number of bags per desired bag chain web length depending on, for example, a continuous run setting or a predetermined bag chain web bag count (e.g., variable by menu setting) or less preferably there is utilized a single independent bag feed operation (e.g., a one bag setting in the above-described potential bag chain setting count which is a standard "FIB" system setting described above and is thus a less desired setting when a present pad formation assembly is being utilized with the FIB system, but can be made available nonetheless).

In an embodiment a continuous setting (e.g., a full roll of supply film converted into a continuous bag chain of the same representative length) or a relatively high number bag chain count (e.g., greater than five (5) bags in chain) is implemented. This allows the web of bags to travel through the pad formation assembly, which in a preferred embodiment is a cushion forming system, as a single entity (e.g., an interconnected chain of bags with end-to-end seal webbing linkage).

The feeding of a single entity web of bags under embodiments of the invention helps in avoiding the main causes of bag explosions and/or bag jams that afflict earlier conveyor based pad molding systems as described above. However, as described below, there is a requirement for added complexity in providing a downstream cutting mechanism away from the convenient seal wire location of the FIB system jaws which is considered to be a reason why the conventional systems cut at the bag making module output in conventional systems.

The feeding of a single entity, continuous web of bags under embodiments of the invention is one factor, when utilized, that allows for full automation, free of operator intervention, unlike existing conveyor based pad molding systems (e.g., those that cut individual bags with a standard bagger and then attempt to feed those not yet cured, cut bags into an adjacent conveyor based pad molding system). As seen below, however, with some embodiments described herein this involves the inclusion of additional equipment and method steps for a preferred handling of a bag chain web, as in the addition of means for a proper shut down sequence which places one or more non-filled bags outward of the bag making module to avoid trying to feed in expanded bags during a restart, as well as means for avoiding the potential for further complicating a jam up situation upon the attempt to feed in additional bags into the pad formation assembly when a jam up occurs downstream. As explained below, however, embodiments include features that enable operation of a bag chain web system despite the above noted obstacles that led away from conventional systems implementing the same.

For example, in one embodiment of the pad formation assembly there is further featured a draw-in monitoring sensor device (e.g., a sag or droop sensor or bag chain web draw in confirmation sensor device) which provides a means to detect if the web is not being properly drawn into the conveyor system. The draw-in monitoring sensor device preferably comprises means for confirming proper web bag travel and means for an automated shutdown of the pad formation operation (e.g., via a shutdown of the bagger operation and downstream pad formation assembly) if there is sensed a potential problem in web bag travel as when a droop (as in more than a typical droop used in a normal bag chain feed to a horizontal conveyor) in the bag chain web is detected. In an embodiment, the draw-in monitoring sensor device includes the use of a photoeye working as a sensor in the sensor device.

In an embodiment of the pad formation assembly, there is further featured a conveyor that comprises a projection-recess series as in a "corrugated" or sinusoidal profile conveyor belt or other conveyance mechanism that imparts a convoluted surface in the pads formed.

Unlike conventional conveyor based, flat cushion molding systems, an embodiment of the invention produces a foam cushion that is substantially different in that there is produced, for example, a pad that has one corrugated surface and only one flat surface (e.g., one side having a convoluted or corrugated surface with the opposite side having a smooth or less convoluted surface).

An embodiment also preferably makes use of only a single moving conveyor component unlike the standard conveyor based, flat cushion molding systems which require two juxtaposed and moving conveyor components running in the formation of flat cushions in their flat cushion molding system. Further that one non-moving conveyor component can be a smooth platen from one end to the other without any interruptions or cavities. Further, in an embodiment each pad produced from the received bag chain has a multi-projection convoluted surface as in one with repeating and continuous projection and recess combination across a full major exposed surface of the pad.

Also, under an embodiment, the bags are preferably not separated from the bag chain web until the output end region of the conveyor system, and then there is preferably provided separation means comprising an automated cut position sensing system for use with a bag chain web cutting mechanism to achieve cut implementation in the bag chain web with the separated bag being separated from the upstream remaining bag chain web at the output end region of the conveyor.

For example, in one embodiment there is provided a cut position sensing system that comprises a sensor switch mechanism as in a microswitch or a plurality of the same, preferably mounted above and/or below the moving web and also preferably near the output end of the conveyor (e.g., one or two microswitches positioned above the moving web and positioned at a location that is suited for establishing a cut region within a foot of the output end of the conveyor). The sensing system provides means for sensing a cut zone as in sensing a seal webbing portion of the bag chain web that is not filled with foam as in the web region film formed between the two seals such as the non-foam filled end-to-end seal webbing areas formed by the above-described sealing mechanism (e.g., spaced apart non-cutting, but plastic film bonding seal wires of the heated jaw in the FIB system described above). While more cumbersome in most environments, an embodiment can also feature alternate sensing means and/or trigger timing implementation means (e.g., one or more sensors sensing a sloped side end(s) of a conveyed bag by contact or optical photosensing or the like or initiation upon detection of an initial full height level detection location for a conveyed bag and carrying out a suitable timing to trigger cutting in a suitable area as in the noted no-foam region between pads, and/or using optical markings or alternate cutting location triggering means to set in place, for example, a coordinated timing sequence with an activated cutter mechanism). Thus, a variety of triggering means methods can be relied upon in the separation means for separation device or that function to determine a present location of the bag chain web relative to the cutter mechanism, to determine the relative timing needed between bag chain web movement and cutter mechanism operation, and to achieve bag separation from the bag chain web at the desired point and location in time.

In one embodiment the sensor system features a single microswitch assembly that is preferably mounted less than 6 inches (e.g., 2 or 3 inches) upstream of the cutting location as in the location where a heated cutting wire of one or more cutting jaws contacts the web material.

Also, in an embodiment of the pad formation assembly, the cut zone is about ¾ inches wide, and thus the separation means with cut sensing system and cutting mechanics are designed to be sufficiently accurate as to implement a suitable cut within that relatively limited length relative to either a stationary pad pair or, alternatively, a cutter mechanism that moves or is arranged so as to allow for a moving bag series at the time of cut implementation (e.g., a cam operated cutter system, as in one or more cutters supported on a cutter support conveyor track which can be independent or integrated with a bag moving conveyor).

In one embodiment, the cutting mechanism or cutter means comprises a pair of cutting jaws with one or both being adjustable as in each being pneumatically driven toward the other such as with air cylinders built into a linear thruster mechanism with dual guide shafts, and with the cutting mechanism preferably being associated (e.g., supported) by the pad formation assembly and not the bag formation means.

Relative to an embodiment of the cutting device or means for cutting, one linear thruster is mounted below the web and one mounted above. Also, relative to this arrangement in the cutting device, when the cutting device is actuated both jaws preferably move simultaneously so that they meet near the plane of web motion.

As a cutting mechanism of the cutting device there is preferably provided a heated wire (e.g., Nichrome wire of about 0.015" in diameter) that is mounted to the lower jaw with the upper jaw providing a suitable compression contact anvil surface or vice versa or with both being provided with cutting elements as in a double contact heat resistance wire or component arrangement.

A cutting means embodiment features an arrangement that provides for the hot wire severing the bag from the web when the jaws come together, although other arrangements are also featured as in perforations that are separated there or further downstream by, for example, roller feed speed up relative to the web travel speed inclusive of an outfeed conveyor having corresponding projection recess gripping profiles as to catch the corrugated surface of a pad leaving the pad conveyance assembly. Alternatively, a perforated bag chain web can be produced for use at a later time and/or location by having the operator or additional remote equipment separate individual bags from the bag perforated bag chain web. Preferably additionally featured is a no-cut and cut switch mode control that is also preferably provided together with a control system associated with the pad formation assembly that enables an operator to choose (or toggle between) which mode is desired.

In a preferred embodiment the cutting means operates such that the bags are cut by the hot wire (or other cut device or means such as a laser (or an alternate focused heat applicator), mechanical device (as in a sharp edged blade) or fluid based cutting (as in a high pressure jet of fluid, etc.) a few inches downstream from the microswitch or alternate sensor for triggering the cutting means.

Also, the cutting mechanism of an embodiment of the present invention preferably features a cut wire that is powered by a constant voltage driver so that the cutting wire stays at a relatively constant temperature (as compared for example to a less preferred impulse based system, which impulse based cutting wire systems are used in conventional FIB systems and which impulse based systems do not feature a relatively constant temperature in the wire or resistance element).

An embodiment of the pad formation assembly also features an outfeed device as in an outfeed conveyor at the exit of the pad conveyor system that is designed to move the pads (e.g., just ready to be separated pads or just now separated bags at the downstream end of the confining molding sections of the pad formation assembly) away at a speed greater than that of the bags in the bag web when traveling through the conveyor molding system (e.g., 1.25 to 2 times faster) and/or with the above-described common corrugated grip arrangement as in replacement of a simple bearing roller set with a corrugated conveyor belt which measures with the formed pad configuration.

Utilization of an outfeed device provides for movement of the cut bags more rapidly away from the upstream web thus creating a tensioned, easy to cut gap between the to-be-cut/separated bag and the end of the web as well as a quick movement of a cut/separated bag away from the cutting region.

Preferred is an outfeed device having an outfeed conveyor that moves the formed pad to a downstream reception component, if present, such as an operator (for e.g., the pad to be put into immediate use), to an accumulator bin, and/or to another conveyor system that transports it to another area for immediate use or storage.

An embodiment also preferably features a cut or separation confirmation sensing system that also preferably has a photoelectric eye or similar sensing means as the above-noted cut positioning/timing sensor. Also, the cut confirmation sensing system also preferably has its sensing means mounted underneath the outfeed conveyor and suitably positioned for detecting the gap between the cut bag and the end of the web, although multiple sensors and/or alternate positioning arrangements are featured under the present invention such as described above for the cut position sensing system.

If this gap is not detected within a predetermined time period, the system assumes that there is a problem and shuts down (e.g., an inoperative or contaminated cutting heater wire as a source of a no web cut problem).

Also, depending on the sensing means utilized, a common sensor device (e.g., single sensor or integrated, communicating sensor set) can be used for a variety of the above described functions (e.g., determining cutting timing and determining whether a cut and separation has actually been achieved).

An embodiment also includes a "form feed" control device, whereupon at a time of conveyance stoppage, there is produced one or more unfilled bags by the FIB bagger as to facilitate restart without having over expanded bags entering the conveyance system.

An embodiment includes all of the various features described above, although other embodiments of the present invention also include systems with one or more (e.g., any one of the various sub-combinations possible) of the various features described above for embodiments of the present invention.

DETAILED DESCRIPTION

Figure 5:
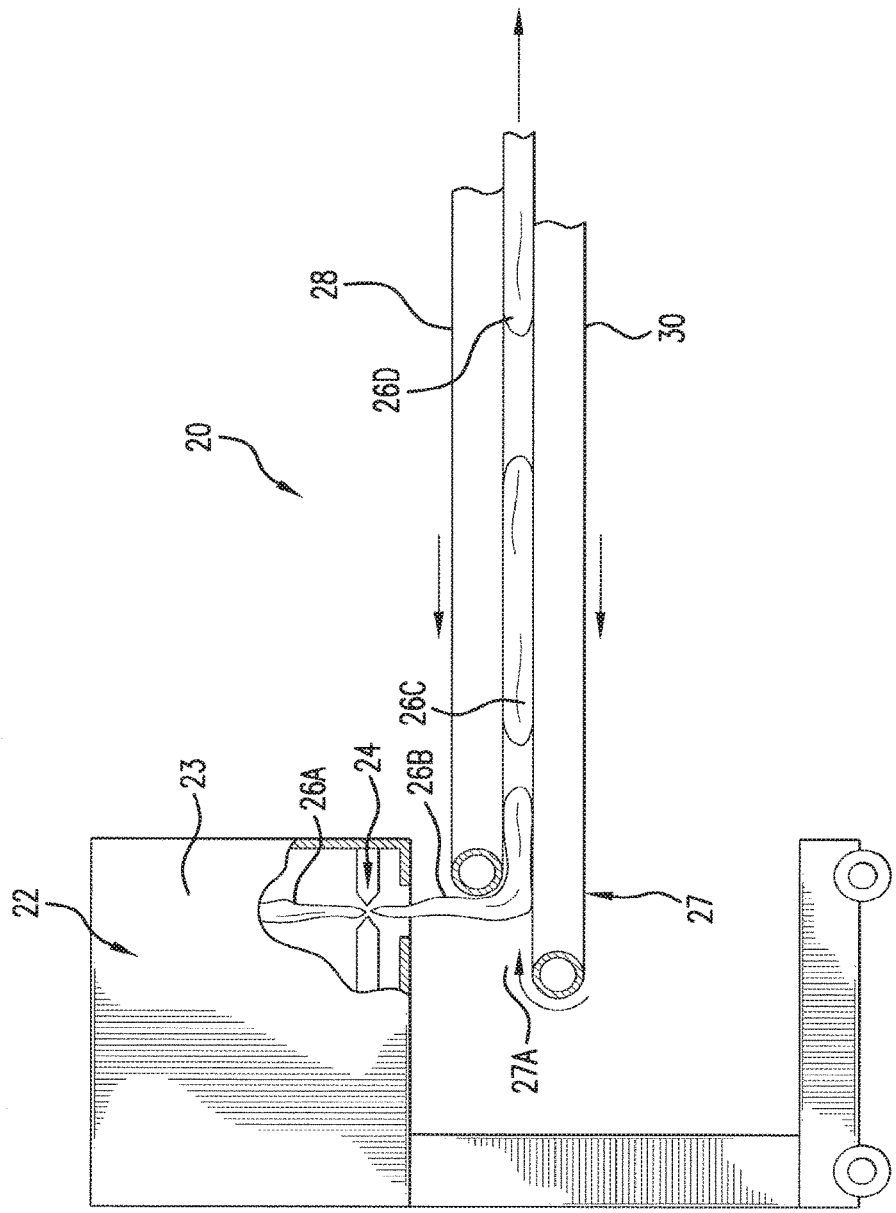
FIG. 5 shows an input zone of a conventional pad formation assembly receiving completely formed bags from an upstream positioned FIB device with the filler material yet to fully cure.

With reference to FIG. 5 there is seen a conventional pad formation system 20 having FIB system 22 with a combination sealing and cutting mechanism 24 used to both seal and cut to-be-completed bag 26A from the completed bag 26B (with the completed bag containing, for example, mixed precursor chemicals for polyurethane foam in a fluid, still in an early curing stage). In situations where edge seals are involved in the bag formation the edge seals are formed within the FIB housing with an edge sealer (not shown) positioned upstream of the end sealer 24 shown. Thus, each bag generated by bag making module 23 of the FIB system 22 is cut from the upstream film webbing (with C-fold webbing, two independent sheets webbing, slit tube webbing being examples of film webbing conventionally fed though an FIB system) at the exit zone at the bottom of the bag making module 23.

As further seen from FIG. 5, after the cut, the separated bag 26B drops from the bag making module 23 of the FIB system 22 and is fed to the input end 27A of the dual (top/bottom) moving conveyor assembly 27 having conveyors 28, 30. FIG. 5 also shows the top conveyor 28 stepped inward to a certain degree to facilitate capture of the separated bag, but as mentioned above an operator (not shown) assists in the transference to the conventional dual moving conveyor assembly 27 of a flat cushion formation system 20, since a "foam up" can be anticipated if the system is left unattended. In a vertically oriented conventional conveyor set there is not present such a step-in, but as with a horizontal conventional conveyor a vertical conventional conveyor presents "foam-up" issues.

Between the moving conveyors 28 and 30 there is further illustrated bags 26C and 26D being carried by the moving conveyor system 27 as, in the illustrated system, the foam material expands and travels toward a "closer to being" or "at cured" state as it moves along within the confines of the above and below moving conveyors shown.

Figure 6:
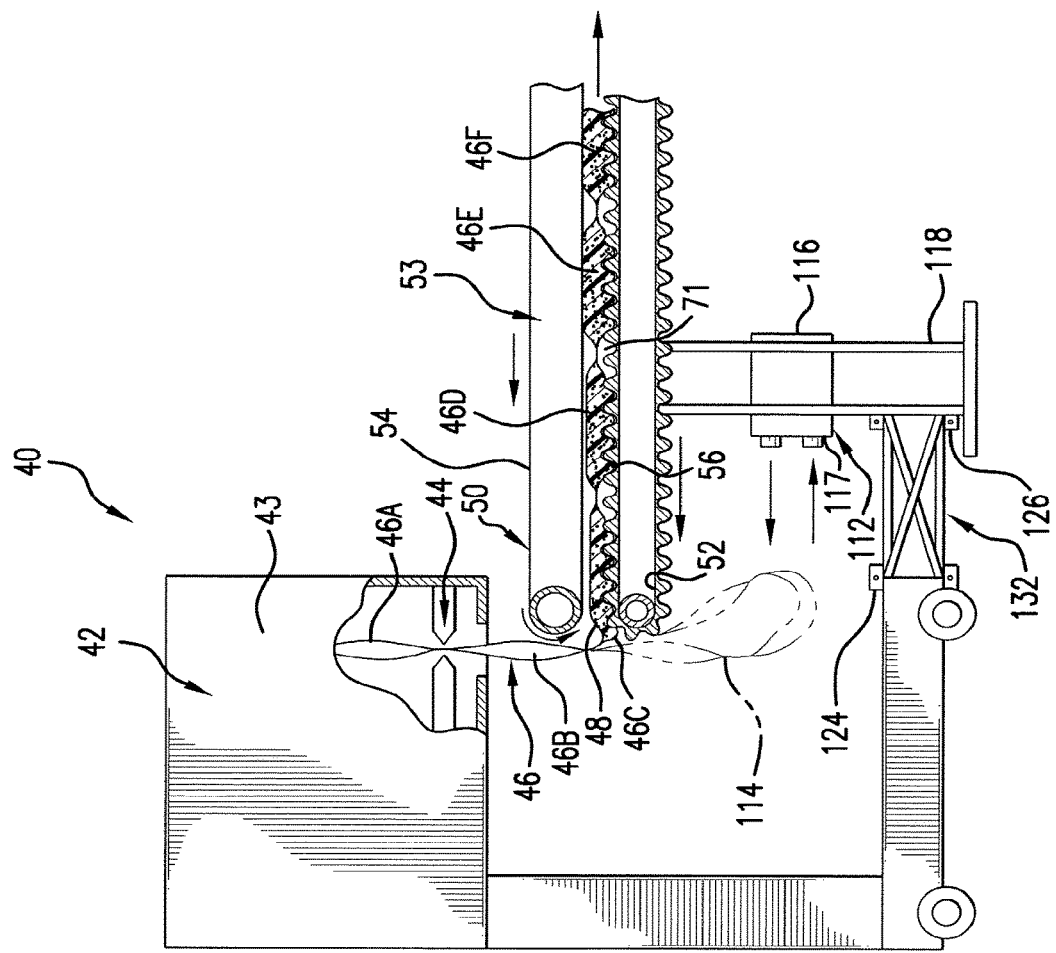
FIG. 6 shows an input zone of a pad formation assembly embodiment receiving completely formed bags from an upstream positioned FIB device with the filler material yet to fully cure.

With reference to FIG. 6 there is seen an embodiment of pad formation system 40 of the present invention shown as an embodiment having pad enclosure formation device 42 as in the illustrated bag making means in the form of an FIB system like that of U.S. Pat. No. 7,331,542 which includes bag making module 43 with an end sealing (non-cutting) bag sealing mechanism 44 set up (e.g., altered) to seal but not cut the to-be-completed bag 46A from the completed bag 46B. Thus, the bags being generated by bag making module 43 are not cut from the film web at the exit zone at the bottom of the bag making module and there is thus fed a continuous pad chain 46 (or bag chain in this embodiment) into the input end 48 of pad formation assembly 50. Further, in a preferred embodiment, such as that shown in FIG. 6, all seals associated with the bag or enclosure (from which a pad is formed) are completed to the extent desired upon departure of the pads from the FIB device (e.g. in some instances a discontinued seal region is used for venting if the filler material releases gas as in a foam precursor mix, but this venting seal discontinuance is typically a minor percentage of an overall seal in recognition of the confinement function requirement of the seal). In the FIG. 6 embodiment web length of the bag chain 46 is shown as being continuous at least within the pad formation assembly, as in a continuous bag chain generated during the full operation cycle of the pad formation system. That is, if no undesired interruption occurs (which interruptions are more commonly involved in the prior art systems), as long as the pad enclosure formation system operates, the bag chain will be continuously fed into the conveyor assembly 50. At, for example, the output end of the pad formation assembly, individually formed bags can then be separated, or a desired predetermined set of formed bags (bag chain sub-sets) can be separated from the remainder of the bag chain being fed to the output end. Further, there is preferably also implemented, via suitable control means, means for implementing an intentional discontinuance of bag chain feeding as in an implemented stop by the operator for switching of bag width size or a switch out to a new supply roll of bag formation film. Alternatively, an intended-predesignated length bag chain can be generated, as in a logic control with operator board or the like to input operator desired bag chain length values (as some examples or operator controlled bag chain length implementation).

As further seen from FIG. 6, bag 46C is shown as an intermediate bag relative to a chain of bags including bags 46A, 46B (upstream) and bags 46D,46E, 46F (downstream). FIG. 6 also shows the bag chain having a curvature generally lying above (or only a limited extent below) the bottom surface of bottom conveyor 52 (as opposed to a large droop 114 in the bag chain (described below) as the chain of bags leaves the bag making module and is fed into the input end 48 of the dual (top/bottom) moving conveyor components 52, 54. Also, as seen the bags entering the inlet 48 of the conveyors have pre-established the required seals (e.g., the formation of end seals and edge seal(s) having been already preformed upon the respective, just formed bag first contacting the conveyance assembly (as in complete formation of the seals prior to breaking the plane of the most upstream end of the conveyance assembly and/or having the seals completely formed at a location closer to a dispenser foam output location into the bag than the inlet end of the conveyance assembly and/or the most upstream end of the conveyance assembly—viewed another way, the bag can be considered in one embodiment of the present invention as having all seals formed upon departure from the FIB bagger as in the FIB bagger supporting the sealing structure and filler material dispenser structure on a common support platform which support platform is also preferably releasably detached to the conveyance assembly or pad formation assembly and with the dispenser and sealing structure preferably being under a common housing of the FIB bagger (as shown)).

FIG. 6 further shows an embodiment of pad formation system 40 comprising first and second moving conveyor components 52, 54 of conveyance assembly 53. Alternate conveyance assembly designs are also featured under the present invention as in, for example, only one moving conveyor component and a non-moving pad thickness conformance extension as a second "conveyor component" (e.g., a smooth, low friction solid platen of the conveyance assembly). FIG. 6 also shows a conveyance assembly arrangement wherein there is an above/below conveyor component set (52, 54) with the illustrated bottom or first conveyor component 52 having the non-flat conveyance surface and the top or second conveyor component 54 having a flat, non-convoluted surface for providing a flat surface in the pads such as pad 46F shown passing through the pad formation assembly 50. Conveyance assembly 53 can represent alone the below described pad formation assembly 50 or a sub-assembly thereof, as when there is added, for example, the below described outfeed conveyance device 98 added sub-assembly, such that the pad formation assembly 50 comprises conveyance assembly 53 together with the outfeed conveyance device 98 in an alternate embodiment.

Pad formation system 40 preferably comprises a foam in bag generation means such as the above noted FIB system together with pad formation assembly 50 (inclusive or exclusive of an outfeed conveyance device). Also, as seen from FIG. 6, the embodiment has the pad or bag seals completely formed by the filler (e.g., foam) in bag generation means such that upon the bag chain being received at the inlet end of the conveyance assembly the bag formation itself is complete although pad formation is not yet finalized for those filler material types involving expanding material.

Alternate conveyance assembly embodiments, in addition to the above described parallel moving and horizontal, parallel conveyor belt set arrangement, include, for example, conveyor sets arranged in an inclined orientation or a vertical orientation. Also, the conveyor belts or components (e.g., 52, 54) of the conveyance assembly are preferably arranged parallel to one another although one or both may be inclined relative to the other in alternative embodiments as in less than a 5 degree incline in one or both to achieve, for example, a more open entrance and a narrower spacing downstream of the opening. Further, the conveyor components of the conveyance assembly can include a straight line incline arrangement or a multi-line incline set up as in a sloped infeed and a non-sloped downstream section in one or both of the conveyor components (not shown).

Further, the reference to the conveyor components is in reference in one embodiment to a continuous length structure from infeed to outfeed end with the length being governed by the anticipated cure rates of the pads being formed such that they can retain their shape to a suitable extent by the time they depart the output end of the conveyance assembly. Examples of continuous length conveyor components include a single loop conveyor belt(s) or single loop conveyor belt with opposing solid platen, although alternate embodiments of the invention for either or both of the conveyor components are featured under the present invention. This includes, for example, conveyor loop sub-sets as in multi-loop conveyors arranged in series or adjacent individual rollers as a non-loop or solid body roller sets as the "conveyor component". These sub-set combinations can include, for example, relatively inclined arrangements as well and still be "continuous" even with gaps therebetween (e.g., a first conveyance component section (e.g., conveyor loop) conveyor section at an obtuse angle relative to a second conveyor component section (e.g., loop)) conveyor.

There is also preferably featured a conveyance assembly that is essentially in a non-stepped end arrangement as in the illustrated second conveyor component 54 (upper) which is not stepped inward or outward relative to the first conveyor component (unlike system 20 having the upper conveyor stepped inward to a certain degree to facilitate capture of the separated bags into the conveyor set). Rather, as shown in FIG. 6, the input ends of the first and second conveyor components are shown at about a common location (e.g., each flush to a common plane or within less than 6 inches of that plane). This difference is but one of many possible differences stemming from the notion that, unlike the arrangement of FIG. 5, where a "foam up" can be anticipated if the system is left unattended, there is not the same level of concern for a foam up under an arrangement such as that shown in the FIG. 6 embodiment and thus operator assistance can be avoided or lessened.

Further, FIG. 6 shows an embodiment of pad formation system 40 of the present invention, featuring two moving, single loop belt conveyors as the conveyor components 52, 54 with one non-flat (e.g., non-planar) conveyor component 52 having pad contact surface 56, as in a surface that is convoluted such as a corrugated or sinusoidal pad contact conveyance surface. FIG. 6 also shows only one of the two conveyor components having a non-flat surface although alternate embodiments feature both conveyor components having the same or similar convoluted pad contact/formation surfaces (e.g., both pad contact conveyor component surfaces 56 being sinusoidal with different amplitudes or wavelength spacings and/or with flat intermediate spacings between convolutions and/or with shifted convolution projections relative to each other, or alternate pad formation (and preferably driving) contact means).

Under the present invention reference to the non-planar pad "contacting" surface 56 includes indirect and direct contact between the pad and the moving conveyor body (e.g., the pad's enclosure material such as plastic film material being in direct contact with an exposed surface of a conveyor belt (e.g., a monolithic convoluted belt or a conveyor belt having a base with added projections supported by the base as in a base formed of a continuous sheet of material or a non-continuous base as in a chain-link base structure). The conveyor base is preferably in driving engagement (or driven supported engagement) with a belt driver assembly or belt support assembly S (FIG. 9) featuring a bracket connection B between the outer frame structure F and conveyor side casing C (one of two shown) having suitable gearing and belt engagers extending therebetween and in connection with a driving motor (not shown) to achieve movement of the illustrated corrugated belt pad.

"Contact" between the convoluted conveyor component and the pad also entails indirect contact via one or more intermediate members as in an added intermediate belt or protective liner layer whether integrally joined with a conveyor belt or moving independently relative to the conveyor belt or the like (e.g., a plastic protective sheet roll out-roll up arrangement at opposite ends of the conveyor assembly). In an alternative embodiment, one or more protective film sheets are fed together with the bag chain web between the belt and bag surface, although with a lowering of foam-up potential, such protective film(s) are considered unnecessary for most applications.

While there are advantages in having the bag chain web driven by at least one, if not two, opposed convoluted pad driving belts, alternate embodiments of the present invention feature one non-driving convoluted but movably supported (e.g., passively driven) conveyor belt and another convoluted driving conveyor belt or non-corrugated driving belt. Again, however, an arrangement where there is a non-flat or convoluted pad driving conveyor component and plus, for example, (i) a flat panel (fixed or driven or also a driving (e.g., reciprocating panel) conveyance component), (ii) a second, flat conveyor component that is a driving conveyor component or a passively driven conveyor component as the conveyor component (e.g., a flat belt conveyor); or (iii) a second, non-flat driven or driving conveyor component (e.g., a duplicate convoluted conveyor belt) are representative of alternate embodiments of the present invention. For example, one or both conveyor components can feature a conveyor belt with a non-flat contact surface and also one conveyor can be eliminated if the main conveyor has a corrugated belt in favor of a fixed platen for the second conveyor component in the conveyor assembly.

Figure 1:
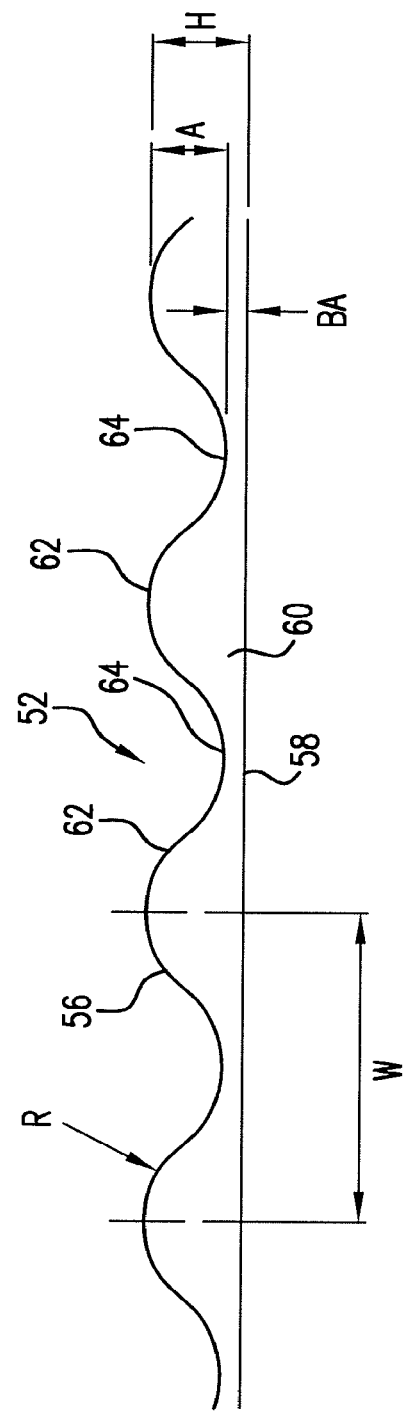
FIG. 1 shows a representation of a projection/recess in a convoluted conveyor element (with a sinusoidal or corrugated belt configuration shown, having a surface shape that preferably is also representative of the convoluted surface formation of a pad formed on the convoluted belt).

Such arrangements are unlike conventional pad formation designs wherein flat foam cushion molders feature two conveyors, each with a flat belt such that the cushions manufactured on these conventional systems have two flat and parallel faces. Accordingly, the present invention provides for a different pad design (e.g., a different pad design as in a foam, such as a polyurethane foam, protective cushion pad) having one flat side and one non-flat side as in a sinusoidal or corrugated surface as the convoluted surface. FIG. 1 shows a schematic view of a corrugated belt profile that is illustrative of a preferred non-flat or convoluted surface profile for one (or two opposing) conveyor components in pad formation system 40 featured under the present invention and shown in FIG. 6.

Figure 2:
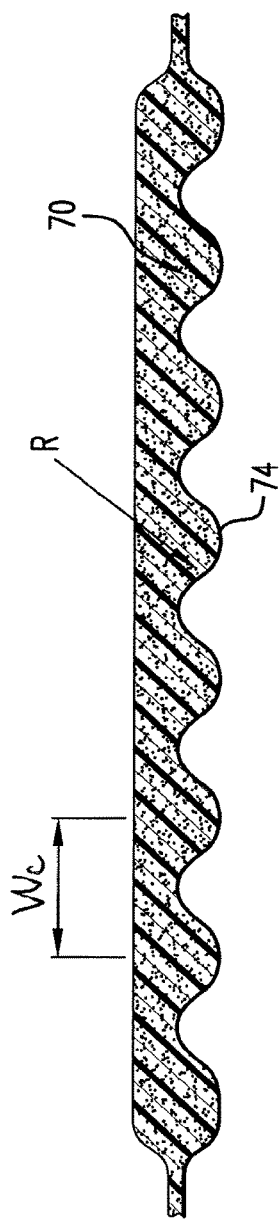
FIG. 2 shows a cross-sectional view of a pad formed under the present invention with the illustrated embodiment comprising one flat face positioned opposite a face having a corrugated or sinusoidal surface profile with the grooves and projection shown in cross-section preferably extending across the full face of the pad shown.

The corrugated profile 56 of the conveyor assembly is designed to provide pads with a corresponding convoluted surface as represented by convoluted surface 74 in pad 70 shown in FIG. 2. This convoluted surface in the pad produced provides a pad with improved flexibility as in a flexibility level that enables a cured foam pad to bend around corners or to better conform to the shape of an object (e.g., bend about a curved surface or a polygonal side wall set of a cushioned object and/or the container itself and/or to fit or better fit upon folding into the corner of a container and/or hold in position a corner edge of an object). The design of the non-flat surface (e.g., projection and recess arrangement inclusive of size and/or shape of the respective projections and recesses of the non-planar conveyor component of the conveyor assembly) is designed to exceed the flexibility level of conventional flat cushions having a common maximum upper surface/lower surface thickness over their cushion support area. For example, flat foam (e.g., polyurethane) cushions tend to be fairly rigid and usually buckle when bent at extreme angles—such as a bend over 30 degrees. Thus, with the arrangement of the present invention, there is achieved non-damaging flexibility in excess of a 30 degree bend and preferably up to a 90 degree bend (with the noted bend angles inclusive of acute angle formation on either side as in bending one way (acute side) and back the other way (acute angle now opposite the original and now obtuse side of the pad)). In other words, the pad design of the present invention (as in a corrugated or sinusoidal surface) is designed to more readily bend and/or fold without buckling or at least avoiding significant (e.g., potential cushion function degrading or degradation of the enclosure surface as in bag rippage) impact on the foam at the bend line or bend line region. This is facilitated with smooth contouring to avoid more readily abutting projections upon bending as in the sinusoidal projection pad surface in pad 70. Also, this flexibility feature is governed to some extent by projection and/or groove depth as a minor surface convolution would not generate a lot of flexibility potential in the produced pad (e.g., a greater than 50% valley depth relative to maximum cushioning thickness height being an embodiment of the invention).

Figure 3:
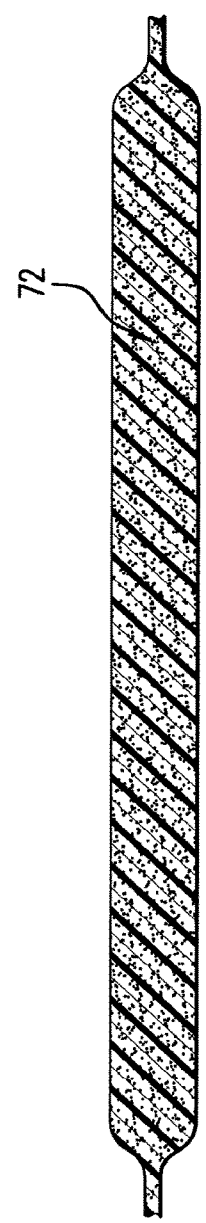
FIG. 3 shows a cross-sectional view of a conventional pad formed with opposing flat faces.

In this regard, reference is made to FIGS. 1, 2 and 3 with FIG. 1 illustrating in schematic fashion a non-flat conveyor component 52 of conveyor components of pad formation assembly 50, which is preferably a driving component of the conveyor assembly, but can also, less preferably, be a driven component of the conveyor assembly. FIG. 2 shows a cross-sectional view of a pad formed under the present invention with the illustrated embodiment comprising one flat face (e.g., a cushion functioning face) positioned opposite a face having a corrugated or sinusoidal surface profile 74. For comparison, FIG. 3 shows a cross-sectional view of a conventional pad formed with opposing flat faces. Further, FIG. 2 shows tapered ends which illustrate the taper down to a connecting web section that has since been cut or otherwise separated from the bag chain.

FIG. 1 shows a section of a conveyor component (using conveyor component 52 as an example), having a base floor surface 58 (e.g., the interior side of a conveyor belt loop) and a base region 60 (e.g., a base region comprised of a continuous sheet belt base formed of a layer of material providing sufficient tension strength to the base (e.g., a flexible sheet of suitable conveyor material as in one with a limiting degree of tension stretching and sufficient flexibility to conform to a belt loop configuration)). Extending up from the base region is a series of projections 62 with recesses 64 therebetween with the projections 62 shown in repeating sequence, which sequence preferably extends over the full length of a conveyor loop (e.g., all but a conveyor sheet connection location if portions of the projection/recess themselves are not interconnected to complete the loop), although alternate embodiments of the invention are featured including a convoluted pad contact surface featuring one or more non-convolution surface areas separated by one or more convoluted areas, or alternate projection recess areas as well as possible variations along the length as in repeating sequences of alternate height projections (e.g., high-low-high-low or high-med-low-high-med-low projections, or more random variations as some examples). Also, an embodiment of the invention has the projections having an axis of elongation that runs perpendicular to a direction of conveyor travel as to provide a tread-like gripping function.

In the schematic depiction in FIG. 1, there is illustrated a monolithic arrangement in the corrugated conveyor component wherein the projection is an integrated part with the base (e.g., a non-laminated common or composite material conveyor belt with integrated, monolithic base and projection combination). Alternate arrangements under the present invention feature projections that are independent and integrated in non-monolithic fashion with the base as in projections that are adhered or mechanically fastened or heat bonded, or secured by alternate securement means to the base). Also, with the appropriate recess configuration (e.g., base thickness and/or wavelength in the projections), the projections can be formed of a relatively rigid material (e.g., generally non-flexible in the path of conveyance) with the spacing therebetween provided by the recesses providing for loop conformance in this embodiment. In addition, under the present invention the base is formed of a continuous surface loop sheet, or as an alternate embodiment, as a non-continuous surface base component as in a belt structure such as one made of plastic or metal links with the amount of non-continuous openings in that base being based on the notion of providing sufficient pad contact to achieve a desired level of pad formation functioning implementation (via the contact surfaces in the projections and preferably also the contact surface of recesses provided in the base (e.g., pad contact surfaces provided by base via link surfaces)). It is noted that in some instances, as in high strength enclosure material, there can be utilized a relatively open conveyor component surface base (e.g., a majority or more open) with the tensioned, higher strength enclosure material generally functioning as a continuation of the actual limiting conveyor component surface. However, a preferred embodiment for forming foam cushions within thin sheet plastic film enclosures is one having a continuous convoluted conveyor surface in contact with the enclosure material (e.g., solid belt without any openings in the belt contact surface).

Figure 9:
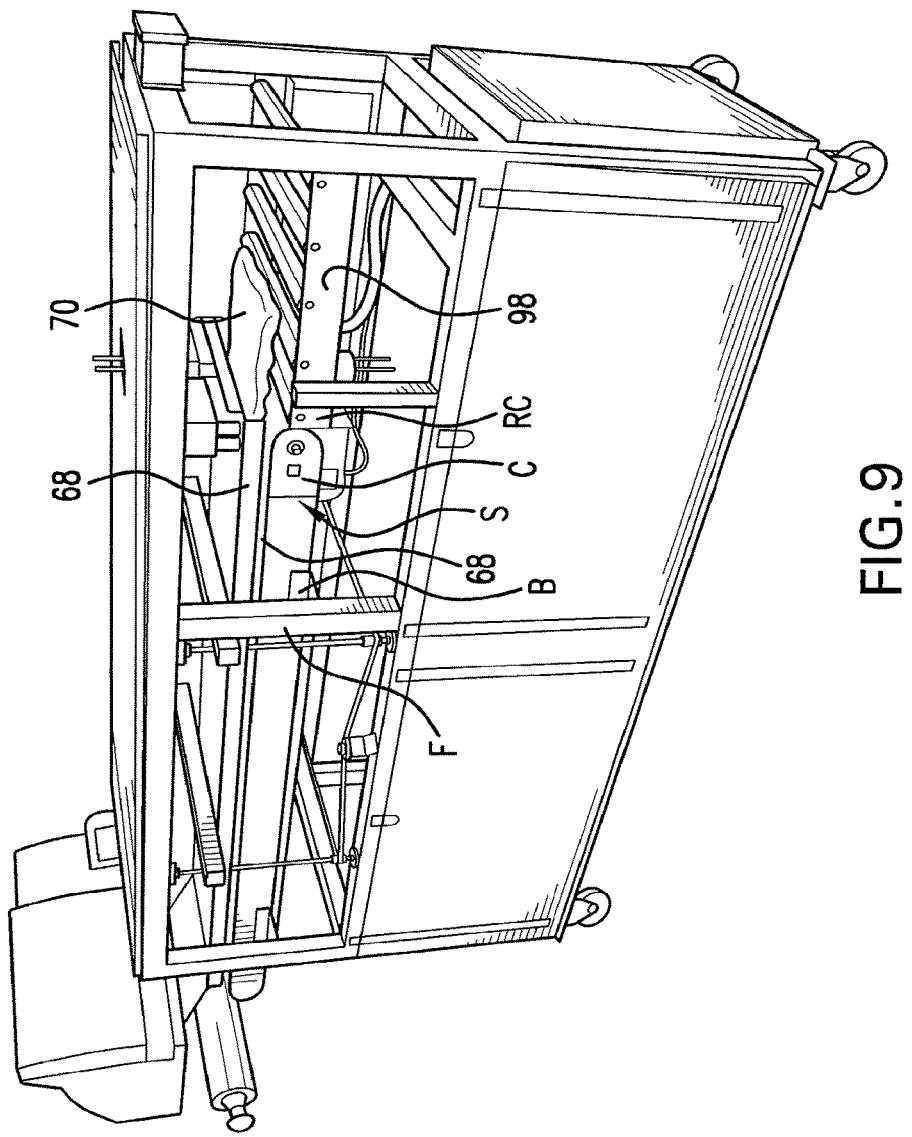
FIG. 9 shows a view of a pad formation assembly embodiment with side covers removed to show the bottom conveyor, the top, non-moving platen, and parts of the cutting system for this embodiment as well as a produced and separated pad from a pad chain.

FIG. 1 also shows conveyor profile surface 56 having wavelength W (with a most preferred distance being about 1.5 inches with a range of 0.5 to 5.0 inches and more preferably 1.0 to 2.0 inches being illustrative of wavelength embodiments or distance between maximum peak to peak points in adjacent projections (and also preferably a similar distance from maximum depth point to maximum depth point relative to adjacent recesses). The overall height of the conveyor component 52 is also shown as H (with a most preferred height also being represented by 0.45 inches with a range of 0.3 to 2.0 inches and more preferably 0.4 to 1.5 inches being illustrative of preferred conveyor component height H). The projection height or amplitude "A" of the projections 62 of conveyor component 52 is also shown in FIG. 1 (with a most preferred height being 0.350 inches with a range of 0.2 to 1.8 inches and more preferably 0.3 to 0.8 inches being illustrative of preferred projection height A). Also, the projection height preferably matches the recess depth in the preferred embodiments featuring a sinusoidal or corrugated (e.g., all curve and/or partial curve and/or in stepped or multi-stepped or straight side walled projections). The base height "BA" thus equals the difference of H minus A. Further, when a preferred sinusoidal pattern is utilized having smoothly curving contouring over the entire surface, the curvature dimension "R" is most preferably 0.5 with a range of 0.25 to 0.75 being illustrative of alternate embodiments. The recess depth to maximum height of pad ratio is preferably 50 to 95%, more preferably 60 to 90% with a value of about 80% being most preferred. Preferably the conveyor belt is formed of a solid or monolithic rubber body or a composite of rubber and suitable strength enhancing filaments or webbing (natural fiber, or man made fiber as in plastic fiber and/or metal wire filaments embedded for extra strength in the conveyor belt). Also, FIG. 9 illustrates base material 60 being suitably flexible to handle a relatively small radius return curve RC (FIG. 9) as in one that represents a ratio of 20 to 100 to 1 to conveyor length.

Figure 7:
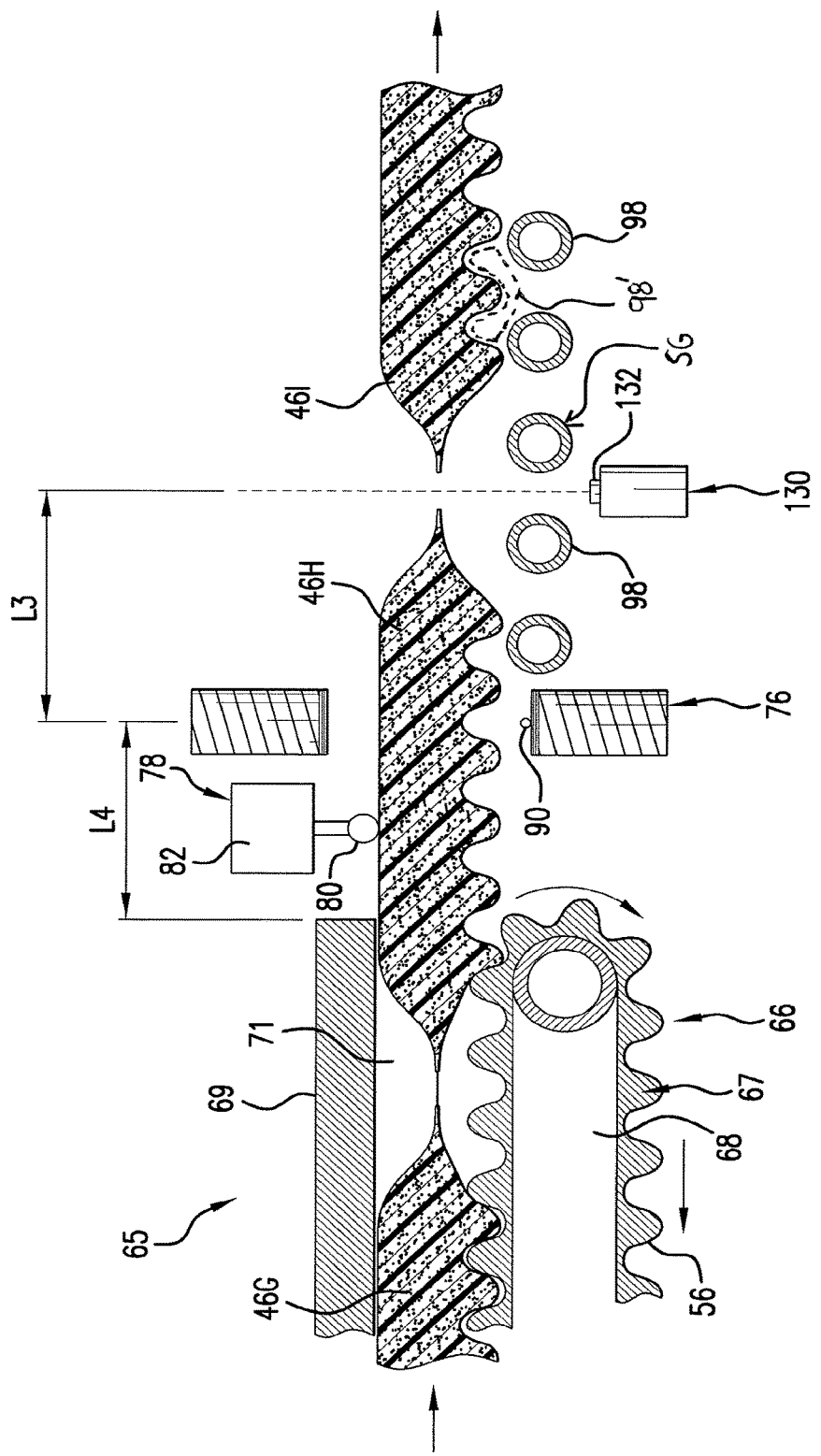
FIG. 7 shows an output zone of a pad formation assembly embodiment similar to that of FIG. 4 but with an added outfeed device receiving separated bags from the upstream bag confining-conveyance section.

FIG. 7 illustrates an alternate embodiment of the present invention comprising pad formation system 65 with pad formation assembly 66 having conveyance assembly 67. As shown in FIG. 7, conveyance assembly 67 has only one driving (and preferably also only one moving) conveyor component 68 amongst conveyor components 68 and 69 used in pad formation following bag chain feed to the conveyor assembly from a pad formation device (not shown in FIG. 7 but can be one such as FIB system 42 shown in FIG. 6). Conveyance assembly 67 is shown with conveyor component 68 having a corrugated or sinusoidal surface 56 as in the earlier embodiment. This corrugated or sinusoidal surface 56 allows for the present invention to run with only one conveyor. Also, the second conveyor component 69 is preferably represented by a less-convoluted or non-convoluted (preferably flat or at least less convoluted then the other conveyor component 68) conveyor component as in a non-moving, flat platen conveyor component (e.g., a metal platen suitable for handling the above described forces associated with an expanding and curing foam cushion pad). This platen preferably comes in direct contact with the pads as opposed to a conventional conveyer belt with panel backing plate for support. The ability to provide a more simplified conveyance system as in one having a non-moving and non-convoluted conveyor component as one of the two conveyor components is facilitated by the opposite, convoluted driving conveyor component's design. That is, corrugated conveyor component 68 with its corrugated pad contact surface easily pulls both the pad itself as well as other pads in the bag chain through the molding zone despite only one driving conveyor component (e.g., a zone extending along a portion or all of the conveyor assembly passageway 71 formed between the conveyor components regardless of their relative orientation as a set (such as horizontal or vertical set orientation) or to each other (such as relative inclines in the set components)). Also, due to the characteristics associated with certain types of pad formation, such as expanding foam cushion pad formation, the use of a flat conveyor belt in a single moving conveyor component conveyance assembly (e.g., a platen and flat conveyor belt loop combination) is considered by the Applicants to lack a drive arrangement that can suitably move the cushions because of the high drag forces involved and the typical slippage (coefficient of friction) potential associated with pad enclosure material utilized.

With reference to FIGS. 2 and 3 there is seen in FIG. 2 a pad (foam cushion pad) 70 formed by an embodiment of the present invention, while in FIG. 3 there is seen a pad (foam cushion pad) 72 formed by a conventional system such as shown in FIG. 5. As seen pad 70 features a corrugated conveyor component contact surface 74 which, in the illustrated embodiment, is the lower surface of the pad, which configuration would occur, for example, in a conveyor assembly such as shown in FIG. 7 wherein the pad being fed through passageway 71 is being driven by conveyor component 68 which, in that embodiment, is shown lying below the pad chain shown as including pads 46G, 46H as well as a separated pad 46I. Thus the corrugated conveyor's contact surface 56 is placed in contact was the pad chain or bag chain web and the surface 56 shape is imparted to the pad being formed as the representative bag cures while traveling between the conveyor components. Also, the pattern formed in the pad preferably essentially conforms to the pattern of the non-planar conveyor component such that the wavelength W for the conveyor belt corresponds to wavelength WC for the pad.

Also, in a conveyance assembly that has a pair of moving, non-planar conveyor components, there would be formed a pad having a similar surface configuration on both exposure/contact sides of that pad if the conveyor components have a similar non-flat contact surface (or there would be formed different non-flat configurations if the relative conveyor components have different contact surface shapes or projections that are not arranged in one-to-one projection alignment). In use as a cushion pad, the corrugated side can either be placed in contact with an object being cushioned and the non-corrugated side in contact with a containing member as in a container (e.g., box), or outer wrapping (e.g., shrink wrap) or the like in which the object is placed or vice versa.

Also, in lieu of a sinusoidal contact surface formation in the pad, a wide variety of other surface configurations are also readily achievable under the system of the present invention as in fabricating conveyor belts with alternate surface profiles. For example, the surface of the non-flat conveyor belt need not have a regular cross section with examples (not shown) found in pads with a mix of flat and sinusoidal sections. Another option is to make a convoluted surface that has a sinusoidal profile in both directions. Further, while a preferred embodiment has the projections extending for a full conveyor component width, alternate embodiments feature projection strip(s) of suitable width(s) to achieve the desired drive through function of the bag chain web and also preferably the formation of a suitable convoluted surface profile in the formed pads not extending continuously the full width with end-to-end openings. Depending on the width(s) of the non-convolution areas between projection strips this arrangement can lessen the flexibility in the bag and thus is less desired in most usage environments of the present invention.

The preferred filling material fed to the enclosure bag is a polyurethane as in one fed into a bag being formed with a polyurethane dispensing system with polyol and isocyanate "A and B-side" chemical feed lines feeding to a mixing dispenser chamber of a dispenser of the dispensing system.

As seen from FIGS. 4, and 7 to 9 there is provided a pad web separator or separation means 76 with an embodiment of a suitable separation means being a mechanical, heated wire cutter mechanism although a variety of other separation means are featured including a perforator upstream with downstream pull off device combination, an energy or material applier as in a laser beam, non-contact heat applier, a fluid cutter, or the like. Pad web separator 76 is preferably provided downstream of the reception entrance of the pad conveyance system (e.g., 53 of FIG. 6 or 67 of FIG. 7) and more preferably at or close to (e.g., just downstream as in less than a foot) of an output end of at least one conveyor component as in the output end of the conveyance assembly in general. That is, in a preferred embodiment of the present invention, cutting and separation of each bag from the film web is done at the output zone of the conveyance system and thus is different than conventional conveyance systems with flat foam cushion molding systems wherein the bags are cut and separated from the film web right at the output zone of the bagger in exactly the same manner as with a standard FIB system. This means that under these conventional system the bags are separate entities as they enter and move between the flat cushion forming conveyors as shown in FIG. 5.

In a preferred embodiment of the present invention, the separation (e.g., cutting) operation is moved away from the output zone of the bagger and put closer to the output zone (e.g., at or near the output zone) of the conveyor system. This means that the film web is preferably uncut (or preferably not fully cut as with upstream perforations) until it exits the conveyance system (e.g., exits the conveyor belt(s)). Under the preferred arrangement of the present invention, the pad chain webbing (e.g., bag chain webbing), which webbing is present between adjacent pad main bodies, is maintained intact through the conveyance system which has shown to help keep the pads from slipping out of position. Whenever pads slip or slide out of their proper positions jam ups can occur which may lead to foam-ups and subsequent damage to the FIB system, the pad molder, and the work area around the machines. Under a preferred arrangement of the present invention, with the pad web left intact during travel through the conveyance system, there is lessened the possibility of bags catching and folding on their way into the conveyor gap.

Figure 4:
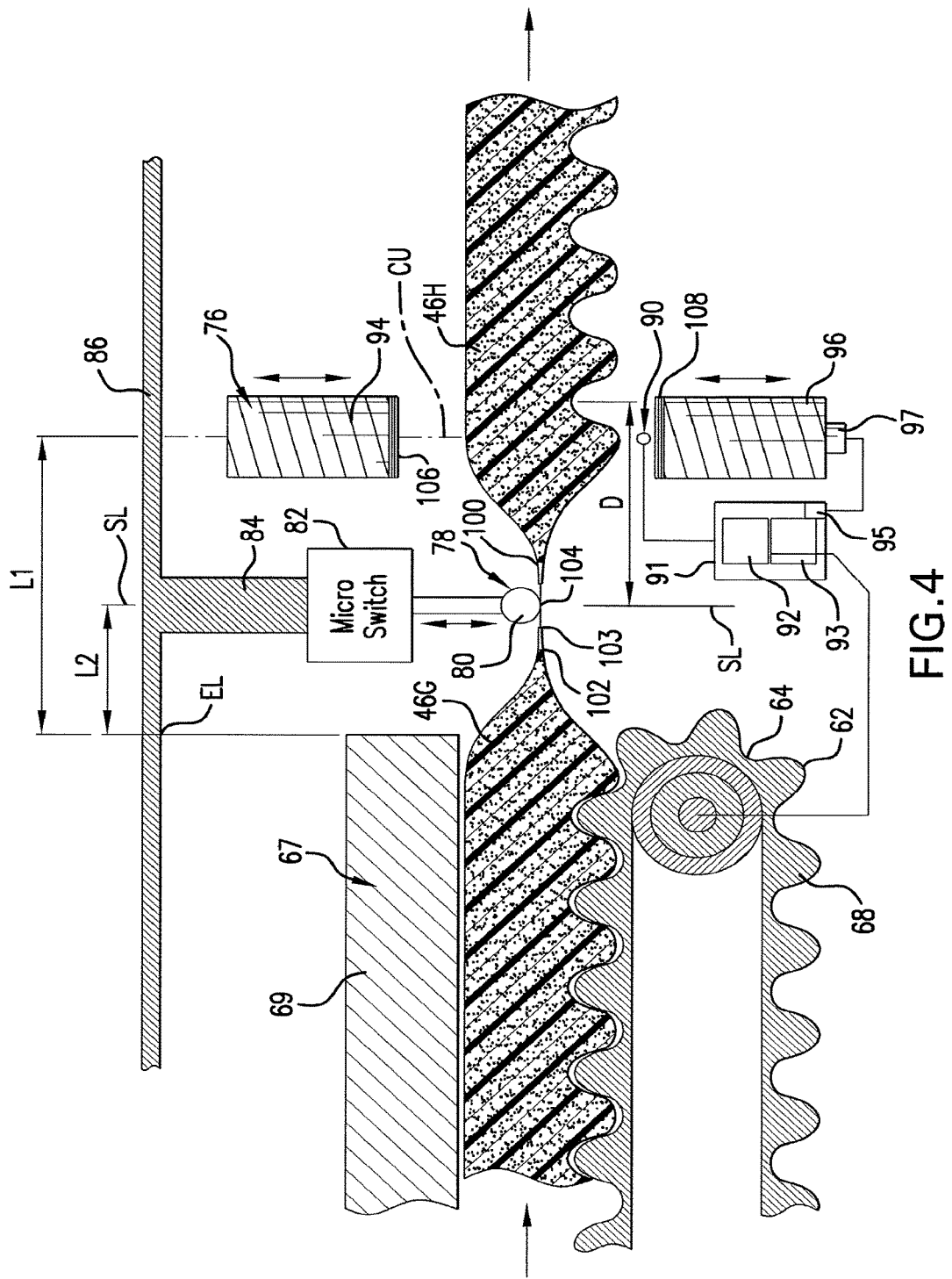
FIG. 4 shows an output zone of an embodiment of the pad formation assembly with a combination rigid platen and single conveyor pad chain driving means as well as combination cutting mechanism timing sensing device and cutting mechanism.
Figure 8:
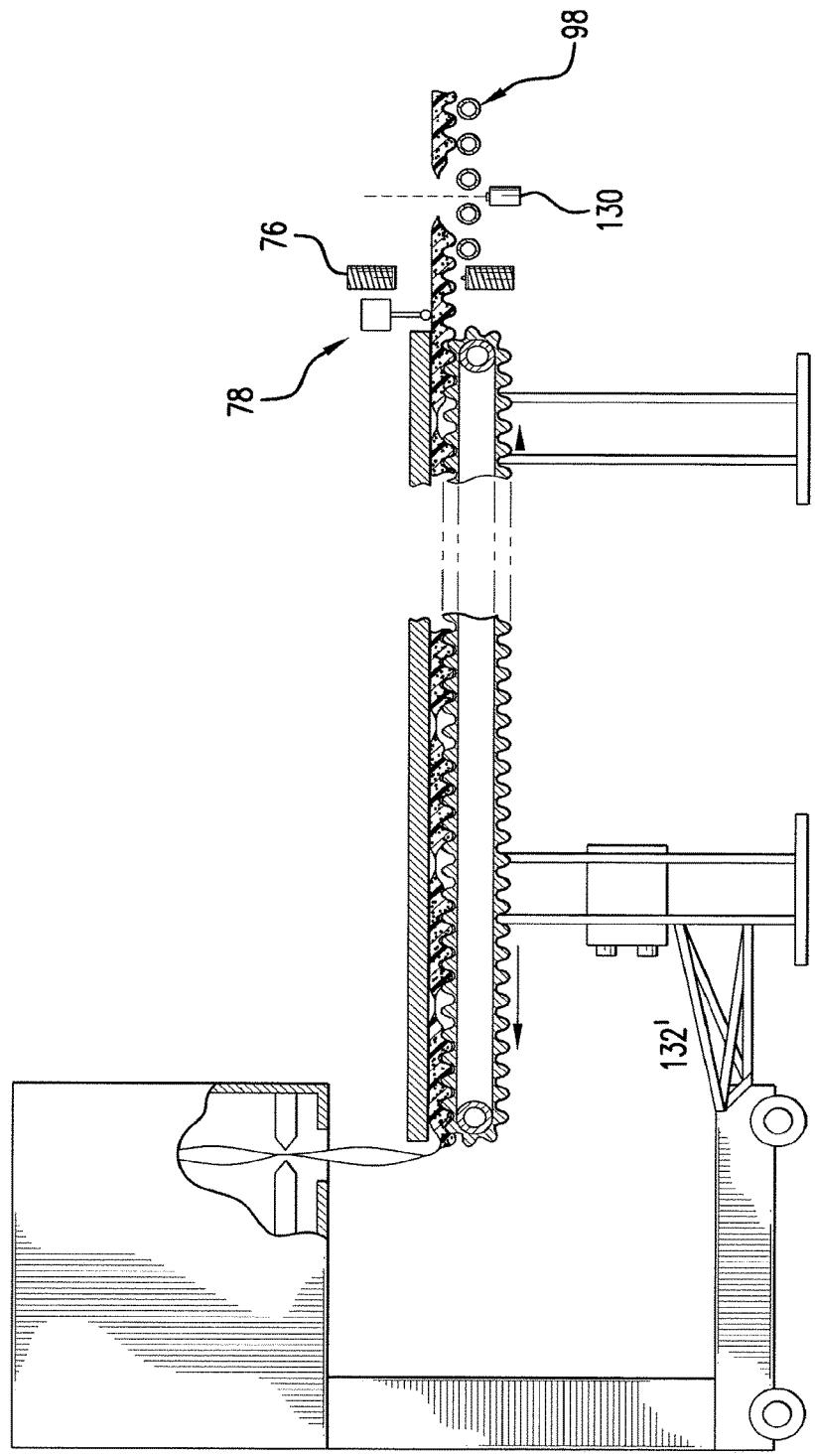
FIG. 8 shows a view of a pad formation system embodiment.

With reference particularly to FIGS. 4, 7 and 8 there is seen a sensing device or sensing means 78 as in a microswitch based sensing device. As seen from FIG. 4, a sensing device 78 is one that has an adjustable contact member 80 that can ride up and down with the surface of the pad web traveling in the conveyance system to trigger microswitch 82 at the appropriate time to initiate a subsequent action as in operation of separation device or means 76 (immediately or a logic control time sequence based on pertinent variables such as pad chain travel speed, relative spacing between the sensing device trigger point (time and/or location) and the separation means, as well as the action time associated with the separation means). Microswitch 82 is further shown in FIG. 4 as having an extension support 84 for properly positioning contact member 80. Extension support 84 is shown secured to machine support frame-structure 86 which comprises an enclosure beam structure extending about the conveyance assembly and providing support for outer side covers 88 (see FIG. 10 for an example of such a cover). Alternate sensing means are also featured under the present invention as in optical sensors (e.g., photoelectric sensors) with or without the use of optical demarcations (e.g. added print on the bag chain) or transverse bag bond seal lines, and the like. In the illustrated embodiment of FIG. 4, the sensing of the cut zone is done with a microswitch form of sensor that is positioned a few inches (e.g., 2 to 12 inches) upstream of the separation means or cutter mechanism 76 (shown as comprising cutting jaws) and picks up the reduction in pad thickness between each bag—created by the absence of foam between the seals—making that portion of the pad substantially thinner than the main portions of the bag chain "web". With the use of such a sensor means there is preferably featured one convoluted side and one non-convoluted side in the pads being formed with the contact 80 riding on the flat or less convoluted side; although, with appropriate depth/rise setting differentials to trigger the microswitch activity, the contact can be made to run along a convoluted side as in a pad having both elongated sides with corrugations (the seal webbing preferably being thinner than the base section below the recesses).

An embodiment of the present invention features a pad molder having separation device 76 in the form of a cutter mechanism that operates heating mechanism (e.g., cut wire 90) based on a monitored, constant power operation, which utilizes, for example, temperature controller 92 shown in FIG. 4 (e.g., a device that monitors the wire temperature with a temperature sensor and then adjusts power being fed to the resistance wire or alternate heater means based on a feed-back loop or a non feed-back loop arrangement that just sets a desired constant temperature without feedback monitoring). In this regard, reference is made to the aforementioned, incorporated by reference, U.S. Pat. No. 7,331,542 as well as U.S. Publication No. 2005010323 which is also incorporated herein by reference and which describe a feedback wire monitoring system in a different setting.

In another embodiment, heating mechanism 90 is maintained at constant power all the time and thus without the need for the above-noted feedback monitoring system (e.g., at least all the time the pad formation system is turned on or powered up, whether in an idle or operating mode, and preferably also when the pad formation system is in a "sleep" mode period wherein the pad formation system, following an extended period of non-use, is automatically placed into a sleep mode when not having been used or timely shut down by the operator as in for 10 minutes or more). Under such a constant power system, there is no feedback loop and thus no need for a means to sense or measure wire temperature. The resistance heater wire (or like heating mechanism) heating system is supplied with a constant wattage which can be manually adjusted to a desired setting and left there to achieve an optimal and consistent cutting temperature. This alleviates the additional limitations associated with the above-described feedback monitored heating system in that with preferred thin wire heating element sizes there is introduced sensing difficulties (e.g., the above-noted feedback monitoring system utilizes the change in wire resistance versus temperature as a means of measuring wire temperature which is problematic for some wire types).

Also, in the constant temperature (non-feedback) heating system preferably even during sleep mode (where the power to the various pad formation system's sub-systems is minimized or shut off) the power to the cutter wire is still maintained. Under the above-noted constant power system for heating wire 90 without the monitoring features described above, there is utilized an open loop arrangement. In both the monitored and a less or non-monitored constant power system, the cutter wire temperature achieved is preferably designed to be at about the relevant enclosure material's melt point or somewhat above, but not too far above as to generate undesired melt build up on the wire. Accordingly, in this embodiment cutter wire 90 is powered up, whether it is cutting or whether it is in idle mode as long as a power source is available for achieving such a powering up (direct or back up power source). Also, with proper adjustment of the input voltage to the wire via control means 92, cutter wire 90 is maintained at close to its ideal cutting temperature at all times.

With this arrangement, cutter wire 92 requires much less cleaning than with standard FIB cut wire controls. For example, cut wires not maintained at a sufficient melt cut temperature can collect a buildup of previously molten, partially burned, and fully carbonized plastic over time. This buildup is minimized according to a constant temperature embodiment of the invention by ensuring that the wire 90 does not drop below the minimum temperature required to cut the film. Keeping the cut wire hot at all times—also prevents the molten plastic from "freezing' onto the cut wire as it cools between cut cycles. This also helps to minimize buildup on the wire to reduce maintenance and increase life span. Furthermore, on previous FIB based pad molding systems, the cut wire typically ran off of impulse power control. With impulse power, it is difficult, if not impossible, to control the wire temperature as accurately as with the constant power approach. This leads to overshooting of the ideal cutting temperature, and subsequent burning of the plastic. It also means that the molten plastic has a chance to "freeze" onto the cut wire as it cools between cutting cycles. Thus, under a preferred embodiment of the invention the cutter wire is precluded from either dropping too far below a predetermined desired temperature or rising above that predetermined temperature (e.g., the cutter wire is prevented from dropping or exceeding the desired temperature (e.g., the melt temperature of the film material of the enclosure) within −±20° F. and more preferably ±5° F. and even more preferably ±2° F. and less) during usage and idle periods and preferably as well during a sleep period, if applicable.

Maintaining the heated wire at a constant, predetermined heat temperature also imparts a much longer life span for the cut wire, than on conventional FIB systems and on all previous pad molding machines. For example, under this embodiment of the invention, wire life is extended because the wire temperature is fairly constant at all times. On a typical FIB cut wire system, as one where the wire operates on impulse sealing control, the wire's temperature changes from room temperature to cutting temperature within milliseconds. This rapid and frequent temperature cycling causes mechanical stresses in the wire and its terminals, which eventually lead to failure. Maintaining the wire at a relatively constant temperature in accordance with the present invention's arrangement and technique minimizes these thermally induced mechanical stress failure mechanisms. This technique requires more power input to the system and also has the disadvantage of keeping the cut wire at a relatively high temp at all times and thus added operator contact care needs to be taken and thus this approach was considered to have been avoided in the noted conventional systems.

Furthermore, under a preferred embodiment of the present invention, the bag making cycle of the FIB system is activated every time the pad formation system molder makes a cut cycle. Again, there is preferably achieved with a suitable controller sub-system as controller sub-system 91 (e.g., a microprocessor and/or logic board) or a plurality of designated controllers working together, with an example of a control system for an FIB system being described in the aforementioned U.S. Publication No. 2005010323 to IntelliPack, Inc. and entitled Operational Control System And A System Providing For Remote Monitoring Of A Manufacturing Device which is incorporated herein by reference. The activation of the FIB system to dispense another pad of the pad chain in response to a cut cycle (e.g., the activation of a cutter (or separation means) or the triggering event can be the activation and/or confirmation of a cut by the separation sensor described below) keeps the two systems (the FIB system and the pad formation assembly) operating in sync; and prevents the bag making module from producing bags faster than the conveyor assembly take them in. The synchronous operation prevent the conveyor assembly from running too fast, which can, if allowed, pull film through the FIB mechanism at an undesired rate which can create extensive problems with the bag making process.

With reference to FIG. 7, there is further seen that the top and bottom conveyor components 68, 69 are arranged such that formed bag 46H is further conveyed outward past the pad formation assembly and pick up by outfeed device 98. Outfeed device 98 is preferably in the form of an outfeed roller conveyor that also supports the output pad at a time of web separation or cutting. For example, in one embodiment the bag to be cut away is supported on the roller conveyor while the seal webbing is positioned in as to be bridging a gap formed between the output of the conveyor assembly and the upstream end of the outfeed roller conveyor 98. In an alternate embodiment shown schematically in FIG. 7, outfeed device 98 is provided with a peak and valley convoluted surface generally designed to conform in mirror fashion to the corrugated surface of the pad produced as to catch and position the separated pad on the outfeed conveyor.

Figure 11:
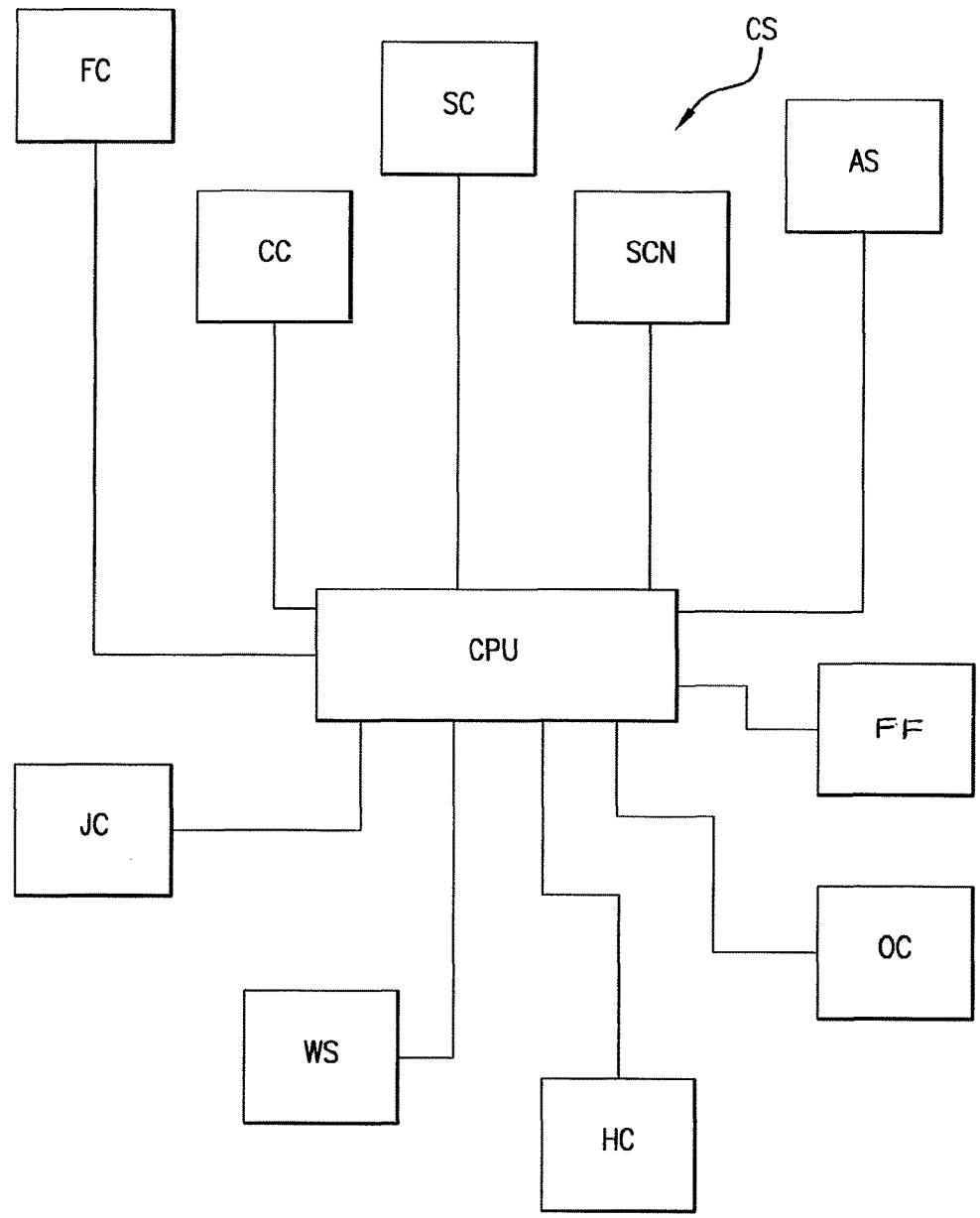
FIG. 11 provides a schematic example of features of an operational control system embodiment.

As further illustrated in FIGS. 4 and 7, sensing device 78 with contact 80 and microswitch 82 is preferably mounted close (within one foot as in 6 inches and more preferably within 3 to 5 inches upstream of the cutter mechanism) with cutting jaws 94 and 96. In this way, sensing device 78 can pick up the gap between the seal of the leading pad 100 and the seal 102 of the trailing pad. In other words, in a preferred embodiment of the invention there is featured means 97 for controlled cutting or separating of two adjacent pads as in means featuring web positioning monitoring means 78 in combination with web separation means 76. Also, separation gap expansion means SG shown as comprising control means operating as to coordinate with the separation means timely differential relative travel speeds between the travel speed of the pad being separated and the travel speed of the next in line bag in the bag chain web). For example, the separation gap expansion system preferably features a speed signal generator to establish a desired roller driving speed in one or more drive rollers of the roller conveyor and/or a speed signal generator designed to maintain an outfeed conveyor roller drive rate that is consistently above the chain bag web travel speed to tension the area being separated (if speed up timing is active just prior to separation) in the seal webbing area which facilitates bag separation and also preferably the higher speed roller in the outfeed roller conveyor moving the separated bag in accelerated fashion away from the cutting region. An alternative of the separation gap expansion means features an upstream braking and downstream speed re-initiation control means with associated conveyor motor control as with the below described control system CS (FIG. 11).

In an embodiment, the seal webbing gap is formed between downstream and upstream seals 100 and 102 (relative to film travel direction) as to form an intermediate seal webbing section 104 that is preferably the cut location when the heated wire 90 comes in contact with the film passing by heat degradation avoidance resistance pad 106 provided at the end of jaw 94 so as to compress and heat cut the same.

That is, in an embodiment, the FIB system (or alternate enclosure forming means) preferably forms a pair of separated seals (100, 102) as by way of a pair of spaced apart heated wires or strips heated to a seal (but not cut) temperature, with each seal of the pair positioned closer to a respective pad main body (e.g., expanded filler material) in the pad chain such that a thinner web sheet section or seal webbing section 104 is formed between those two seals. Seal webbing section 104 is preferably sized to properly receive the jaw compression surfaces 106 and 108 in cutting jaws 94, 96 so as to avoid heated wire contact with pad filler material (e.g., foam) within the adjacent bags. Further, sensor device 78 is preferably designed to detect the thinner in thickness zone region between the bags 46H and 46G in the pad chain (and between the noted seal lines 100, 102). Preferably, this thinner zone 103 is comprised solely of a laminate web sheet section without any filler material provided therebetween (e.g., a laminate web sheet section formed by the two layers of an original C-fold film (gusseted or non-gusseted) brought together and sealed along the free edge region during FIB processing).

The distance D is a distance that places cutter wire 90 (or alternate web separation forming means) downstream of sensor device 78. The distance D between the sensor sensing location and the cut location is designed to accommodate the relative timing of the conveyance system's conveyance of the web sheet section 104 (and pad chain stoppage time at the determined location if applicable) and the timing requirements of the web separation forming means, as in the closing of the jaws 94, 96 of the heated wire support and compression anvil with associated adjustments (e.g., jaw start and/or closure rate) being made for different length pads in the pad chain. The separation location between adjacent bags such as bags 46H and 46G is preferably right at about the center of sheet section 104 (±0.5 to 1 inches tolerance relative to true center positioning) although further deviation is also possible with a preference to avoid any type of seal degradation at seals 100 and 102 or contact with a filled portion or main body of the pad. A preferred distance for D is less than 12 inches with a range of 4 inches to 12 inches being well suited for many embodiments of the invention. Thus, an embodiment takes into consideration the chain web travel speed between the end points represented by distance D and the time it takes for cutter device 76 to be in an actual cut state (wire compressed against web material and anvil surface of adjacent jaw and temperature at desired temperature level which is rendered easier by the above-described constant temperature feature of the present invention as no heat up time delay need be factored in relative to the timing of the time between sensor 78 triggering and placing the film webbing at the desired location relative to the cutting jaws coming into their cut position). This coordination as to web conveyance and placement of the separation means at the proper time and location relative to that web section is carried out by a suitable control sub-system as in the below described separation or cut mechanism control sub-system SC of control system CS (FIG. 11).

As shown in FIG. 4, in addition to distance D between cutting line "CU" and sensory location trigger line SL, there is also shown end plane line EL at the end of the conveyor component (e.g. upper platen 69). Preferably length L1, between EL and CU lines (vertical planes when an above/below conveyor assembly is utilized as shown in FIG. 4) is less than 2 feet and more preferably less than 1 foot (e.g., at or more preferably less than a pad length as in 50 to 90% of the pad length) Accordingly, length L2 between sensor location trigger line SL and the downstream end of a conveyor component is equal to L1−D and is preferably less than 6 inches as in less than 25% of pad length.

As an operating example, sensor device 78, with contact 80 and microswitch 82, detects the gap 103, and the machine control system activates the moving jaws after, for example, a controlled time delay, if required, so that the jaws close on the film for cutting at the time cutter wire 90 is at the central point 104 or at least between seal lines 100 and 102 of seal webbing as it comes into location between jaws 94 and 96 at their point of cut contact.

In the embodiment shown in FIG. 4, both jaws 94 and 96 are preferably moved, unlike a typical conventional FIB machine where one jaw is kept stationary, and the opposite jaw moves. Furthermore, in an embodiment of the invention, cutting jaws 94 and 96 are pneumatically driven which provides close control over timing, although they could be driven with electric motors, electric solenoid actuators, with hydraulic cylinders, or with mechanical cams or alternate cutter operation positioning means.

Thus, in the FIG. 4 embodiment, moving jaws 94 and 96 travel toward the film web gap 103 until they contact and press against each other. Also, cutter wire 90, which is preferably mounted to the lower moving jaw (which supports the wire during the cutting process), moves into a compression cutting state relative to the opposite anvil surface 106 of jaw 94 positioned to an opposite side of the bag chain. When the moving jaws close, the web is preferably cut completely through and the leading bag 46H is separated from the moving web (unlike the seal formation 100 and 102 where, for example, a sealing wire is retained at a temperature sufficient to band plastic together but not cut through). Preferably cutter wire 90 is powered with a fixed and constant DC current determined by a fixed voltage that is applied to the cutter wire 90 as through controller 92. In an alternate embodiment, separation means 76 sufficiently weakens the connection (e.g., melt state, partial cuts, etc.) such that there can be achieved separation as with a speed differential provided by, for example, driven rollers of conveyor 98 being driven at a sufficiently faster rate relative to the upstream, remaining pad chain (which can be either stationary or slower moving) and/or by reliance on a gripping state provided by outfeed conveyor 98.

Also, in an embodiment cut wire voltage is controlled via manual adjustment, and once a predetermined proper voltage setting is obtained the cutter wire temperature rarely needs adjustment. Thus, control system CS preferably comprises heating mechanism control sub-system HC for implementing the adjustable constant power setting. Control system CS can take on various forms as in an internal microprocessor or linked up computer with microprocessor and/or logic control board that is hardware and/or software based or alternate logic control means. The various sub-systems also preferably feature respective logic control means for carrying out the respective functions described herein As an example, separation control sub-system SC preferably comprises a suitable logic processor component (component 93) for activating signaling device 95 which is in communication with the driving components associated with separation means 76 driver 97 (e.g., pneumatic jaw pair driver) as to coordinate their respective motions.

Under this embodiment, accurate control of the heating element temperature while cutting film avoids the problems caused by overheating the cut wire, which include rapid carbon buildup on the wire (which impedes its cutting ability and necessitates cleaning) and shortened wire life as described above. In addition, the arrangement of the preferred embodiments of the present invention also avoids the problem of not cutting (when full cutting is desired), which results from under heating the cut wire.

In an embodiment, cut wire 90 is made of a material that is Nichrome with a solid round cross section, as in one which is approximately 0.015" in diameter. Nichrome material is preferred for this application because it has a very low TCR (Temperature Coefficient of Resistance), which means that the electrical resistance of the wire does not substantially change between room temperature and cutting temperature—which is approximately 400° F. for many preferred usage of the pad formation system. In this regard, reference is made to U.S. Pat. No. 7,213,383 issued May 8, 2007 of IntelliPack, Inc. of Tulsa, Okla., USA which describes some heating and sealing wire arrangements and which patent is incorporated herein by reference. Also, the jaw supporting the heater wire preferably has a relatively hard Durit™ material on its face, which the opposing jaw has a face 106 formed of Silicone rubber (e.g., 0.06 inches thick) with a hardness of about 60 durometer. Further, in the illustrated embodiment, after the cutting process is complete (this takes about two hundred milliseconds) the jaws move away from the web back to their home positions, and wait for the next cut cycle command.

The arrangement of an embodiment of the present invention further provides avoidance of problems associated with bag cutting features. For example, it is noted that the most frequent failure mode with conventional FIB systems is the failure to properly cut the bag from the upstream web. This leads to problems on conventional FIB applications. With pad molding being an attempted automated process in many conventional systems, bad cuts can lead to disaster. As an example, foam ups, jamming and other problems can arise if just one bag hangs up on a cut wire and the bagger just keeps making more bags on top of it. These events often create a mess of foam depending on how long it takes the operator to notice that something is wrong.

Under an embodiment of the present invention with an output end of the conveyor cutting technique, the relatively common cutting failures described above are avoided. This avoidance of a cutting failure and/or failure to timely detect a bad cut is avoided by, for example, the above described constant power cutting process which is more reliable than the above-described impulse power with feedback monitoring method used previously, such that the number of bad cuts is dramatically reduced. In addition, a bad cut at the end of the conveyor will avoid massive foam-ups since the foam is already fully or nearly cured at that point. That is, a bag cut failure at the end of the conveyor is a much less trouble causing event than one at the output of the bag making module wherein a filler may still be expanding as in liquid foam precursor being in a rapid expansion state.

An additional feature provided under an embodiment of the present invention includes means for achieving emergency stoppage of bag production as between an FIB system bag output and conveyance assembly infeed. A preferred sensing system for implementing emergency stoppage system 112 of the present invention is featured in FIG. 6. Emergency stoppage system 112 comprises sensing device 116 for detection of excessive bag droop 114. Sensing device 116 is shown in FIG. 6 as comprising a photosensor device 117 strategically mounted on conveyor support frame structure 118 in an underlying positioning arrangement in this embodiment. In the illustrated embodiment in FIG. 6, photosensor device 117 is shown as a diffusor reflective photoeye sensor device. There is further illustrated in FIG. 6 a releasable locking assembly 120 to help properly position the FIB system relative to the pad forwarding assembly. Locking assembly 120 is shown as comprising connection brace 132 shown in this embodiment with opposite end releasable locks 124 and 126 (e.g., an over center latch or key pin trailer hitch arrangement or bolt down arrangement or tool-less hand knob lock down connection or alternative locking means for precisely sealing and locking the relative position of FIB System 42 and conveyance assembly 53 (as well as supported sensor system 116) while still providing for ready separation and repositioning of servicing of the mobile FIB system 42 shown).

Photosensor device 112 detects bag chain web sag or droop between the output of the bagger and the input of the conveyor system. Current pad making machines simply drop their bags so that they can be fed with manual assistance, into the gap between the opposing conveyors. As mentioned earlier, in a conventional system the bags are cut and separated from the main web as they exit the bagger so they are separate entities from that point going forward as shown in FIG. 5, for example. Unlike those systems, an embodiment of the present invention works in a different manner with an advantage over previous methods as it helps to avoid exploding bags, foam-ups and pad jams that have beleaguered previous conveyor based cushion molder designs.

The emergency stoppage system is shown with sensing device 116 (with its 117 photoeye) mounted at a location suitable for differentiating between a normal course of travel for the pad chain and a deviation in that course of travel brought about by a disruption as in a downstream bag jam (e.g., a normal travel course may feature a 6 inch or less droop below the central horizontal plane located between the respective conveyance systems' components due to a curvature in going from the outlet of the FIB to the conveyance system inlet, while a disruption (e.g., downstream jam) can result in a larger droop factor such as one greater than 6 inches with, for example, about a foot or more under the noted central horizontal input plane of the pad molding conveyors being a generally suitable sensor location as it provides for minor deviations in normal travel while timely picking up a large droop due to a disruption. More precise disruption detection positioning of less than one foot is also possible, but the added spacing helps in the above noted regular travel deviation potential. As shown, sensing device 116 preferably faces towards the FIB system, and is designed to pick up the film web if it droops into its sensing zone as illustrated by the dash-lined bag path 114. This system is also suited for alternate orientations of the conveyance system as a jam would lead to a deviation (e.g., a build up on one side or the other in a pad chain section in a vertically oriented conveyance system which would occur upon bag jam such that a sensor (such as sensing device 116) positioned to each side can readily pick up a conveyance disruption).

When sensing device 116 does sense the presence of film, the FIB bagger is placed in a stop making bag mode and the conveyors are directed to stop moving based on information provided by pad chain jam sensor control sub-system JC. An embodiment of the invention features a sensing device for use in detecting bag chain excessive droop that comprises a diffuse reflective type of photoeye which has two basic component parts built into it, a light source or emitter and a light sensor or collector. If the film web drops into the photoeye's sensing zone, some light from the emitter will be reflected back towards the light sensor. When the amount of light received by the sensor reaches a pre-set threshold level, the photoeye reacts by sending a low voltage signal to the system controls. This halts the bag making process and also stops the motion of the conveyor system. Other types of presence or non-presence detecting means are featured in U.S. Pub. No. 2009/0056286 to Intellipack Inc. and which application is incorporated herein by reference.

In the embodiment shown, for example, in FIG. 6, the bagger and the pad molder are set up so that there is a moderate (e.g., five to six inches) droop or sag in the film web that is suspended between the output of the bagger and the input of the conveyors during normal operation. The web droop/sag will increase if the bagger is making bags faster than the conveyor is producing pads and/or if the pad molding conveyors have slowed or stopped completely—or if the microswitch controlled cutting jaws are out of sync with the web of pads. If such bag web drooping and the likely jam situation caused by that is not addressed and bag production is continued to be allowed, the foam filled bags coming out of the bagger may expand and cure to the point where they can no longer be pulled into the conveyor without damaging the integrity of the bags and/or causing a foam-up at the entry zone of the conveyor. On previous pad molders, the bagger had no way to sense if the conveyor has jammed or slowed down. The bagger will continue to make bags and since these bags do not enter the conveyor they accumulate at the output zone of the bagger and they expand as normal, unrestricted bags. Eventually the FIB system will foam itself up, sometimes in a spectacular manner. Sensing system 116 helps to prevent problems if the bagger and the pad molder get out of synchronization. The bagger making module of the FIB system can be prevented from making an additional bag unless the conveyance assembly is in a state that is ready to accept one. The emergency stop system or droop detection system 112 preferably is in communication with a processor pad chain jam sensor control sub-system JC with the droop detection system 112 relaying an excessive droop status signal which is processed as to trigger an appropriate shut down in bag film feed for bag formation and material feed for bag feed and preferably also bag conveyance operation (with also preferably a visual and/or sound alarm device activated) (e.g., see alarm control sub-system AC and conveyance system control sub-system CC which interface with jam sensor control sub-system JC).

An additional feature of an embodiment of the present invention includes a cut or separation status sensing system 130 best shown in FIG. 7. Sensing system 130 preferably includes a sensor device 132 as in a photoeye that is used for detection of proper pad cutting at the output end of the conveyor system. In this embodiment, sensor photoeye 132 is positioned near the output end of the conveyor system and is also preferably mounted so that it looks up (or across depending on the conveyance set up) at a location downstream from the pad formation assembly conveyor end as in between either the end of the pad formation assembly conveyance system and a downstream support or between components of that downstream support structure. As an example there is provided an outfeed conveyor 98 and a sensor which generates a sensor line that extends between two of the powered takeoff rollers of the outfeed conveyor system at the exit end of the conveyor assembly. For example, in an embodiment, photoeye 132 operates as a cut status sensing system 130 wherein the photoeye senses the presence of pads or film as it looks up (or across depending on orientation of the conveyance system(s)). That is, when a pad is cut from the pad chain, a gap is formed between the bag and the downstream end of the remaining pad chain. Also, with driven roller conveyor assembly 98 as the downstream or outfeed pad support, the takeoff rollers are preferably run faster than the conveyor component(s) in the conveyance assembly. Thus, as the bag is cut while on the downstream support the "takeoff" rollers will move the separated bag more quickly away from the upstream chain web, and a gap will form as the separated bag moves more rapidly away. The photoeye thus can sense the gap, as there is nothing above it to reflect its emitted light back to its sensor circuit (or some other form of triggering sensor arrangement). If the pad formation system of the present invention is running normally the gap should be visible on a regular basis, and the gap should be detectable as every cut is made. If the cuts are not being made, however, then no gap will be formed, and the sensor will see the presence of film or pad material constantly. Upon such an occurrence, a signal will be generated by an appropriate logic control means as in separation or cut confirmation control sub-system SCN, and there is initiated a system shut down as in having the system pad formation system (FIB bagger and pad molder) being directed to shut down if at least one gap is missing. In an embodiment of the present invention, there is utilized a diffuse reflective type of photoeye for this application which is preferably of the same or similar type as previously discussed in regards to the web sag detection means in emergency stoppage system 112.

As described above, there is featured in an embodiment of the invention a sensor system for detecting bag droop and/or non-separate bags downstream of the conveyance assembly output. Thus, having a rigid mechanical connection between the FIB system and conveyance assembly of the present invention facilitates proper sensing system positioning. Examples of this form of connection is seen in FIGS. 6 and 8 which show a rigid mechanical connection assembly 132 (132') provided between the base of the FIB system and the mounting stand 118 for the conveyance assembly. This rigid (but preferably releasable) connection also maintains the bagger in the optimum relative position with respect to the conveyance assembly mechanism to insure proper feed of the bag web from the output of the bagger to the input of the conveyor molding system.

An additional feature of an embodiment of the present invention resides in bag length and fill percentage adjustment system while the present invention is running. In this way the length and fill percentage of the bags can be adjusted, on the fly, without stopping the bag formation and conveyance assembly. This can be accomplished by using the standard display and menu/adjust knob on the front of the bagger coupled together with appropriate software or logic processing provided by control system CS, which times the timing of the film feed being used to form the bags in the web, the timing of the material feed as in the foam processor feed and the timing of the sealing means for the bags in the bag chain (reference again being made to the aforementioned FIB control system of IntelliPack, Inc. having a suitable system that is modified to meet the parameters of the present invention as in adding alternate or supplemental logic control boards, etc.). There is thus provided, for example, a suitable material fill rate relative to the time allotted for filling in the bag formation and travel components in the bag making module which are set in conformance as well with the requirements associated with the downstream pad formation assembly.

There is also featured under an embodiment of the present invention a form feed mode process and associated logic control means (which is represented as form feed control sub-system FF in FIG. 11 of control system CS) which is provided in order to stop the present invention operation via a predetermined shutdown sequence referred to as the "Form Feed Mode". Upon the pad formation system of an embodiment of the present invention being shut off (either a predetermined manual shut down and/or via an automatic shutdown, as in one of the emergency shut down situations described above), instead of immediately ceasing operation, the bag module produces a few empty bags and the conveyor system continues to draw them in as if they were normal bags with foam. After a predetermined number of empty bags have been produced so that there are no bags containing rising foam in the droop zone between the output of the bagger and the input of the conveyor system, the entire system shuts down. Without the "form feed" feature bags with expanding foam would be left behind in the droop zone unconstrained by the conveyor/platen system. These bags would expand into a size and shape that the conveyor system would not be able to take in when the system tried to restart. The expanded bags would have to be manually cut out from the web, and the web feed process would have to be started all over again. Hence, with the form feed FF control sub-system the chain can be kept intact despite a stoppage or disruption. The number of unfilled bags generated is preferably sufficient in number to cover the bag chain web distance extending from the end seal of the FIB machine to the intake 48 of the conveyance assembly ranging from, for example, 1 to 5 (or more) bags, depending on the pad length. FIG. 5 shows an arrangement wherein preferably 2 unfilled bags (and possibly just 1) is sufficient to bridge the gap.

An embodiment of the present invention further comprises a fully automatic operation for pad formation. As previously mentioned, conventional flat pad molding systems involve a human operator to ensure (assist) in the process of transferring bags from the output of the bagger to the input of their dual conveyor systems. Without the assistance of an operator there is a tendency for bags to catch on various parts of the conveyor system. This can cause the bags to fold which reduces the internal volume available for the expanding foam often to the point where the bags explode when they are constrained between the conveyors. These bag explosions can damage the conveyor belts and even spurt foam onto the operator, the product being packaged, and into the general manufacturing area. The ability to provide a more fully automated pad formation system is facilitated by one (or any sub-combination or overall combination) of the below designated features:

A) There is structure and methodology that has the film/bag web remain intact until the bag web gets cut into individual bags at or near the exit of the conveyor molding system. Thus, the bags have less of a chance to fold over as they do when they become individualized as when they are cut from the web at the exit of the bagger itself. Further, the pull, through effect of the present invention's design with continuous web feed keeps the web/bags in line and facilitates a smooth feed through, without folding or jamming, through the molding zone. Also, by cutting the bags at the output end of the conveyor molding system there is also avoided the possibility of poorly cut bags jamming up at the entry to the conveyor molding system. For instance, the cutting process under conventional pad formation systems is not always reliable. For instance, it is quite common for a bag to be only partially cut or not cut at all as it exits the bagger. When this happens on current flat cushion molding systems operator intervention is needed to prevent a potentially messy foam-up situation.

B) A further feature of an embodiment of the invention is the facilitating of a fully automatic operation without the need for any human intervention is found in the arrangement of an embodiment of the present invention wherein the cut wire is moved to the output end region of the conveyor (within a foot or two or less of the conveyance assembly output location) and is preferably run at an essentially constant voltage instead of the impulse cutting required when it is done at the output end of the bagger itself.

C) A further embodiment that facilitates the providing of a pad formation system is one that provides a non-flat (e.g., a convoluted conveyor impression surface—which imparts its shape to the molded pad and has more pulling power than a flat belted conveyor).

Operation

Figure 10:
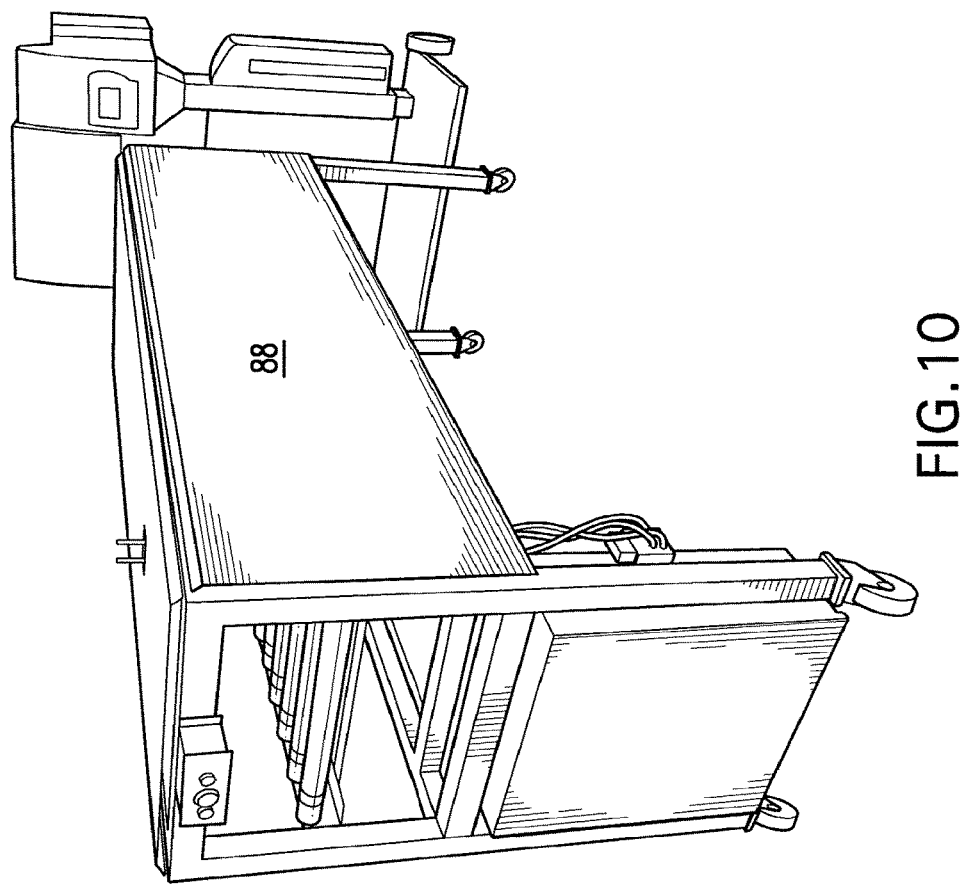
FIG. 10 shows a perspective outfeed device end view of the assembly shown in FIG. 9 but from the opposite side.

The overall arrangement of an embodiment is shown in FIG. 8 and further illustrated in FIGS. 9 and 10 from different viewpoints. With reference to FIG. 8 there is provide an operational discussion for a preferred embodiment of a pad formation system of the present invention. As seen from FIG. 8, a suitable FIB system is provided such that its bag making module generates a bag web or bag chain that features a plurality of interconnected bags with preferably a parallel (upstream/downstream) seal set between each bag pair. As further seen in FIG. 8, the FIB system is braced in relatively rigid fashion to the pad formation assembly having a conveyance assembly with a pair of conveyor components supported by a frame-structure having a plurality of floor mounted braces (or some alternate support means as when dealing with a vertical conveyor component set).

In the FIG. 8 there is illustrated a conveyance assembly having a relatively horizontal bottom moving (driving) conveyor component with a non-flat surface and an above-positioned conveyor component shown as being a relatively rigid, solid platen extending for almost the entire length of the underlying corrugated conveyor component (e.g., less than a foot extension differential and preferably less than a 6 inch differential in the conveyor component). The bag chain web is shown in FIG. 8 with a non-excessive bag droop and thus the sensor mounted on the upstream brace does not trigger an emergency shut down as the bag chain feed is deemed not to be problematic (e.g., with too fast a bag feed relative to the conveyor assembly to timely process downstream bags there is generated a disruption within the conveyance assembly as in the formation of bag droop path 114). Under normal operation with the conveyor assembly and FIB system appropriately synchronized, the bag chain properly enters into the passageway formed between the conveyor components and then the convoluted conveyor drives the bag chain through the conveyance assembly. As a bag reaches the output end of the conveyance assembly a web link sensor senses for a gap between pads with material in them which in turn triggers a downstream separation means or cutting mechanism to operate as in the bringing together of two jaws with at least one having a separation device as in a heated wire which in the present invention is one that is maintained at a relatively constant temperature at all times while the pad formation system's power button is on.

There is further preferably provided a gap separation sensing system positioned downstream of the separation means to monitor whether gaps are separated as the bags are separated individually away from the upstream bag chain. Also, there is preferably further provided separation enhancement means as well as downstream separate bag support as in a roller conveyor platform with preferably one or more powered rollers positioned for contact with a bag being separated such that a powered roller that is driven at a higher speed than that of general bag web conveyance can implement a separation enhancement at the same time or shortly after cut formation.

There is further preferably provided a shutdown logic sequence wherein there is generated one or more non-filled sealed bags that are positioned between the bag making module and the input end of the conveyance assembly such that when the pad formation system is restarted there is not any full expanded and cured pads being fed into the input end of the conveyance assembly. In an embodiment the operational control system comprises a set of control boards (e.g., a central processing unit (CPU) and/or PFGA logic based control boards) that are grouped together and stored in a control panel (e.g., at the FIB unit) in an easy access manner, although independent and/or semi-integrated system are also featured under the present invention. FIG. 11 provides a schematic example of features of an operational control system generally referenced as CS which, in this embodiment, includes a plurality of integrated control sub-systems such as those listed below and shown in communication with a central processing unit CPU (as but one example for carrying out the above described individual sub-system activity and coordinated sub-system interactions):

a) alarm control sub-system (AS);
  b) FIB control sub-system (FC);
  c) Conveyance system control sub-system (CC) (bag making advancement timing);
  d) Separation or cut mechanism control sub-system (SC);
  e) Separation or cut confirmation control sub-system (SCN);
  f) Pad chain jam sensor control sub-system (e.g., bag chain droop sensor system) (JC)
  g) Web separation position sensing and time control sub-system (WS);
  h) Heating mechanism control sub-system (HC);
  i) Outfeed conveyance control sub-system (OC); and
  j) Form feed control sub-system (FF)

Additional control sub-systems can also be separately provided or formed as part of the illustrated control system CS as in a toggle control sub-system (not referenced) for adjusting between FIB direct pad cut and bag chain operation which in one embodiment includes a contact sensor (not shown) contact requirement between the FIB and pad formation assembly (such as at connection location 132 shown in FIG. 6).

As described above, at least some of the above described sub-systems or all or various sub-groupings are preferably integrated as in the above described activation of the FIB control sub-system FC instructing the FIB to advance an additional bag after receiving confirmation of the cutting of a bag by the separation confirmation control sub-system SCN with appropriate sensing to determine if the cutting process took place. Further the alarm sub-system AS is preferably activated (e.g., audio and/or visual on a control panel such as that preexisting on the FIB system as represented by CP in FIGS. 9 and 10) when a sub-system such as the separation confirmation control sub-system SCN senses a lack of separation. Similarly an alarm is triggered when the jam sensor control sub-system JC with sensor 116 deems a pad chain jam up has occurred, preferably also coupled with a shut down via the various control sub-systems such as that for the conveyance system and outfeed sub-system, if present. Also, an alarm status is preferably associated with a shutting down of appropriate active systems as in triggering the FIB sub-system to discontinue any activity in the FIB if currently in an active mode, or when any of the various sub-systems is sensed as not operating properly as in a lack of heat up in the heating mechanism judged by heating mechanism control sub-system HC having associated therewith the above described heating mechanism control 91.

Additional examples of the above described integrated processing features of the present invention include the communication of cut mechanism control sub-system SC in conjunction with the web separation position sensing and time control sub-system WS which, in a preferred embodiment, features the above described sensor 80. Suitable conveyance system (e.g., conveyor belt movement or stoppage or speed adjustment) is also preferably integrated in conjunction with the separation means as in one embodiment featuring a stopping signal with the associated sensed cutting location although other separation means designs provide for the continuous pad chain running (e.g., a synchronized moving cutting mechanism as one example). Also the outfeed control sub-system provides for the appropriate starting and stopping as well as relative conveyance rate differential as to place the chain in tension at the time of cutting and rapidly move a cut pad away from the pad formation assembly.

The drawings provided herein illustrate some of the various embodiments of the present invention as in those with corrugated belt and pad configurations. Various alternate arrangements are also featured under the present invention. All dimensions are in inches unless stated otherwise.

What is claimed is:

1. A foam cushion pad formation assembly, comprising:
   a conveyance assembly having at least one moving conveyor component having a pad shape formation surface, which pad shape formation surface is arranged to shape pads of a pad chain received by said conveyance assembly, said pads comprising enclosed foam material; and
   a separation device which is positioned downstream of a conveyance assembly entrance as to separate shaped pads of the pad chain received by said conveyance assembly;
   wherein the separation device includes:
      a separator that separates adjacent pads in a web region between pads of the pad chain, and
      a pad chain location sensing mechanism that detects a deviation in height in the pad and triggers the separator to separate based on the detected deviation in height.

2. The foam cushion pad formation assembly of claim 1, wherein the separator comprises a cutter that separates adjacent pads by cutting in the web region between pads of the pad chain.

3. The foam cushion pad formation assembly of claim 1, wherein:
   the pad chain location sensing mechanism comprises a sensor that detects the deviation in height; and
   the pad chain location sensing mechanism triggers the separator when the sensor detects a predetermined decrease in the height, which indicates a location between adjacent bags.

4. The foam cushion pad formation assembly of claim 1, wherein:
   the pad shape formation surface has peaks and valleys configured to shape pads of a pad chain to have variations in height, which variations in height are distinct from a variation in height at a web region located in between the pads in the chain; and
   the pad chain location sensing mechanism triggers the separator based on detecting the variation in height at the web region.

5. The foam cushion pad formation assembly of claim 1, further comprising takeoff rollers located downstream of the moving conveyor component, wherein the moving conveyor component moves the pads to the takeoff rollers, and wherein the takeoff rollers travel at a faster conveyance rate than that of the moving conveyor component.

6. The foam cushion pad formation assembly of claim 1, further comprising a droop sensing device that detects excessive bag droop or sag in the pad chain, wherein the sensing device causes the foam cushion pad formation assembly to terminate operation based on detecting excessive bag droop or sag in the pad chain.

7. The foam cushion pad formation assembly of claim 6, further comprising a foam material ejecting device that ejects the foam material into the pads, wherein the droop sensing device detects excessive bag droop or sag in the pad chain downstream of the foam material ejecting device and upstream of an entrance to the moving conveyor component.

8. The foam cushion pad formation assembly of claim 1, wherein the pad shape formation surface is a convoluted surface comprising a plurality of projections and recesses.

9. A foam cushion pad formation assembly, comprising:
   a conveyance assembly having at least one moving conveyor component having a pad shape formation surface having peaks and valleys configured to shape foam-in-bag pads of a pad chain received by said conveyance assembly;
   a foam material ejecting device for ejecting the foam material into the foam-in-bag pads; and
   a droop sensing device that detects excessive bag droop or sag in the pad chain, the droop sensing device being adapted to cause the foam cushion pad formation assembly to terminate operation based on detecting excessive bag droop or sag in the pad chain, wherein the sensor detects excessive bag droop or sag in the pad chain downstream of the foam material ejecting device and upstream of an entrance to the moving conveyor component.

10. The foam cushion pad formation assembly of claim 9, wherein the pad shape formation surface is a convoluted surface that comprises a plurality of projections and recesses.

11. The foam cushion pad formation assembly of claim 9, further comprising:
a separation device that separates shaped pads of the pad chain received by said conveyance assembly; and
a separation confirmation sensing device that detects an incomplete separation of adjacent pads in the pad chain conveyed through said conveyance assembly.

12. The foam cushion pad formation assembly of claim 11, wherein:
the separation confirmation sensing device comprises a sensor that detects a connection between adjacent pads in the pad chain; and
the separation confirmation sensing device is adapted to cause the foam cushion pad formation assembly to terminate operation based on the sensor detecting a connection between adjacent pads of the pad chain.

13. The foam cushion pad formation assembly of claim 11, wherein the separation device includes:
a cutter that separates adjacent pads by cutting in a web region between pads of the pad chain; and
a pad chain location sensing mechanism that detects deviations in height in the pad chain, and triggers the cutter to cut based on detecting a predetermined deviation in height in the pad chain.

14. A foam cushion pad formation assembly, comprising:
a pad shape formation surface having peaks and valleys configured to shape foam-in-bag pads of a pad chain to have a surface with variations in height, which variations in height are distinct from a variation in height at a web region located in between the pads in the chain;
a cutter that separates adjacent pads by cutting in the web region between pads of the pad chain; and
a pad chain location sensing mechanism that senses the distinct variation in height at the web region between the pads, and triggers the cutter to cut the chain in the web region between the pads based on sensing the variation in height at the web region.

15. The foam cushion pad formation assembly of claim 14, wherein the variation in height at the web region is greater than the variations in height across the surface of the pad.

16. The foam cushion pad formation assembly of claim 14, wherein the foam-in-bag pads each have an interior filled with a solidifying foam material, and the web region between the pads is sealed off from the pad interiors and is unfilled with the foam material.

17. The foam cushion pad formation assembly of claim 14, further comprising a separation confirmation sensing device that is adapted to detect an incomplete separation of adjacent pads in the pad chain by detecting a connection between adjacent pads, and cause the foam cushion pad formation assembly to terminate operation based on detecting an incomplete separation.

18. The foam cushion pad formation assembly of claim 1, further comprising a separation confirmation sensing device that detects an incomplete separation of adjacent pads in the pad chain conveyed through said conveyance assembly.

19. The foam cushion pad formation assembly of claim 18, wherein the separation confirmation sensing device is adapted to cause the foam cushion pad formation assembly to terminate operation based on detecting an incomplete separation.

20. The foam cushion pad formation assembly of claim 19, wherein the separation confirmation sensing device detects an incomplete separation by detecting a connection between adjacent pads.

* * * * *